(12) United States Patent
Mozel

(10) Patent No.: US 9,725,848 B2
(45) Date of Patent: Aug. 8, 2017

(54) DYE DISCHARGE INKJET INK COMPOSITIONS

(71) Applicant: Kornit Digital Ltd., Rosh HaAyin (IL)

(72) Inventor: Jacob Mozel, Kfar-Saba (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 14/440,357

(22) PCT Filed: Nov. 14, 2013

(86) PCT No.: PCT/IL2013/050948
§ 371 (c)(1),
(2) Date: May 3, 2015

(87) PCT Pub. No.: WO2014/076705
PCT Pub. Date: May 22, 2014

(65) Prior Publication Data
US 2015/0284905 A1    Oct. 8, 2015

Related U.S. Application Data

(60) Provisional application No. 61/726,103, filed on Nov. 14, 2012.

(51) Int. Cl.
| | |
|---|---|
| G01D 11/00 | (2006.01) |
| D06P 5/15 | (2006.01) |
| C09D 11/38 | (2014.01) |
| C09D 11/40 | (2014.01) |
| D06P 1/00 | (2006.01) |
| C09D 11/54 | (2014.01) |
| D06P 5/30 | (2006.01) |
| D06P 1/62 | (2006.01) |
| D06P 1/647 | (2006.01) |
| D06P 1/649 | (2006.01) |
| D06P 1/651 | (2006.01) |
| D06P 1/673 | (2006.01) |
| B41M 3/00 | (2006.01) |
| B41M 5/00 | (2006.01) |

(52) U.S. Cl.
CPC .......... *D06P 5/15* (2013.01); *C09D 11/38* (2013.01); *C09D 11/40* (2013.01); *C09D 11/54* (2013.01); *D06P 1/0024* (2013.01); *D06P 1/626* (2013.01); *D06P 1/627* (2013.01); *D06P 1/647* (2013.01); *D06P 1/6491* (2013.01); *D06P 1/65168* (2013.01); *D06P 1/65175* (2013.01); *D06P 1/6735* (2013.01); *D06P 1/67375* (2013.01); *D06P 5/151* (2013.01); *D06P 5/155* (2013.01); *D06P 5/30* (2013.01); *B41M 3/001* (2013.01); *B41M 3/006* (2013.01); *B41M 5/0017* (2013.01); *B41M 5/0023* (2013.01)

(58) Field of Classification Search
None
See application file for complete search history.

(56) References Cited

U.S. PATENT DOCUMENTS

| | | | |
|---|---|---|---|
| 4,252,845 A | 2/1981 | Griffiths et al. | |
| 4,364,739 A * | 12/1982 | Tomibe | D06M 11/53 427/126.1 |
| 4,686,260 A | 8/1987 | Lindemann et al. | |
| 5,874,372 A | 2/1999 | Morishita et al. | |
| 7,134,749 B2 | 11/2006 | Ben-Zur et al. | |
| 2004/0186200 A1 * | 9/2004 | Yatake | C09D 11/38 523/160 |
| 2005/0287356 A1 | 12/2005 | Li et al. | |
| 2007/0017413 A1 | 1/2007 | Kwan et al. | |
| 2007/0103528 A1 | 5/2007 | Pearl et al. | |
| 2008/0012926 A1 * | 1/2008 | Hara | G03G 15/01 347/158 |
| 2008/0250967 A1 * | 10/2008 | Souma | C09D 11/38 106/14.45 |
| 2010/0104899 A1 | 4/2010 | Bae et al. | |
| 2010/0170300 A1 * | 7/2010 | Yanagi | D04B 1/18 66/202 |
| 2012/0040148 A1 * | 2/2012 | Mozel | B41M 5/0011 428/195.1 |
| 2013/0083116 A1 | 4/2013 | Fukaya et al. | |
| 2016/0194509 A1 | 7/2016 | Mozel | |

FOREIGN PATENT DOCUMENTS

| | | |
|---|---|---|
| CN | 101284962 | 10/2008 |
| EP | 0834538 | 4/1998 |
| EP | 1980599 | 10/2008 |
| WO | WO 2005/115089 | 12/2005 |
| WO | WO 2011/018786 | 2/2011 |
| WO | WO 2014/076705 | 5/2014 |
| WO | WO 2015/025310 | 2/2015 |

OTHER PUBLICATIONS

International Preliminary Report on Patentability Dated May 28, 2015 From the International Bureau of WIPO Re. Application No. PCT/IL2013/050948.
International Search Report and the Written Opinion Dated Jul. 3, 2014 From the International Searching Authority Re. Application No. PCT/IL2014/050448.
International Search Report and the Written Opinion Dated Feb. 20, 2014 From the International Searching Authority Re. Application No. PCT/IL2013/050948.

(Continued)

*Primary Examiner* — Erica Lin

(57) ABSTRACT

A dye discharge composition exhibiting extended shelf life and/or pot life and high suitability for inkjet printing on dyed substrates, is disclosed. The composition comprises a reducing agent such as, for example, a sulfur-based reducing agent, and a chelating agent, such as a sodium salt of a polyamino carboxylic acid chelating agent. Use of the dye discharge composition in combination with a translucent colored composition and an optional opaque underbase composition, for forming an image on a dyed substrate is also disclosed. Processes for inkjet printing of an image on a dyed surface using the dye discharge composition, kits for use in such processes or an ink formulation containing same are also disclosed.

27 Claims, No Drawings

(56) References Cited

OTHER PUBLICATIONS

International Preliminary Report on Patentability Dated Mar. 3, 2016 From the International Bureau of WIPO Re. Application No. PCT/IL2014/050448.

Official Action Dated Jul. 14, 2016 From the US Patent and Trademark Office Re. U.S. Appl. No. 14/912,405.

Supplementary Search Report and the European Search Opinion Dated Jun. 8, 2016 From the European Patent Office Re. Application No. 13855113.0.

Restriction Official Action Dated May 12, 2016 From the US Patent and Trademark Office Re. U.S. Appl. No. 14/912,405.

Official Action Dated Oct. 26, 2016 From the US Patent and Trademark Office Re. U.S. Appl. No. 14/912,405.

Notification of Office Action and Search Report Dated Jan. 4, 2017 From the State Intellectual Property Office of the People's Republic of China Re. Application No. 201480053658.7.

Translation of Notification of Office Action Dated Jan. 4, 2017 From the State Intellectual Property Office of the People's Republic of China Re. Application No. 201480053658.7. (4 Pages).

\* cited by examiner

DYE DISCHARGE INKJET INK COMPOSITIONS

RELATED APPLICATIONS

This application is a National Phase of PCT Patent Application No. PCT/IL2013/050948 having International filing date of Nov. 14, 2013, which claims the benefit of priority under 35 USC §119(e) of U.S. Provisional Patent Application No. 61/726,103 filed on Nov. 14, 2012. The contents of the above applications are all incorporated by reference as if fully set forth herein in their entirety.

FIELD AND BACKGROUND OF THE INVENTION

The present invention, in some embodiments thereof, relates to inkjet printing and, more particularly, but not exclusively, to dye discharge compositions and uses thereof in inkjet printing.

Dye discharge printing, also known as extract printing, is a method of forming a design onto a dyed substrate, typically a fabric, by printing thereon a color-destroying (dye discharging) agent, such as chlorine or hydrosulfite, to bleach out a light pattern on to the darker colored substrate. In color-discharge printing, a dye or pigment, which is impervious to the discharging agent, may be combined with the reducing (discharge) agent so as to color the discharged part of the substrate thereby imparting a colored design instead of dye-free areas on the substrate.

Discharge printing has the ability to make bright, opaque colors on dark fabrics, while keeping the substrate's surface smooth and allowing the finished fabric to exhibit a soft hand-feel owing to the fact that substance is withdrawn rather than added to the fabric in the printing process.

Newly developed discharge ink systems involve highly reactive chemicals that are typically derived from stable compounds by decomposition at high temperature. This advancement opened the door to discharge printing for the standard screen (stencil) printing techniques.

Successful light-on-dark printing with standard inks relies on a white background silhouette or a white underbase layer, increased pigment loads, fillers and other additives to block out the color of the substrate. Discharge inks modify the garment color by removing the substrate's original color and optionally replacing it with the new ink color.

One of the most promising technologies for printing high quality color designs and images, particularly in small batches of varying contents (short runs of variable data), on a wide variety of types and shapes of substrates, such as textile surfaces, is inkjet printing. Inkjet printing is a widespread technique in which a stream of a specific liquid ink composition is ejected as droplets from a cluster of minute nozzles (printheads) in response to electrical signals generated by a microprocessor to record characters and patterns on the surface of a printing subject without making direct contact between the ink application apparatus and the surface of the subject (non-impact printing). A typical inkjet printing system includes methods and apparatus in which electric signals are converted to mechanical signals for a continuous or on-demand jetting of an ink composition which is continuously supplied and stored in a nozzle head portion, to thereby record characters, symbols and patterns on the surface of a subject.

Dye discharge ink compositions are typically suitable for screen printing, and are less suitable for inkjet settings, due to, for example, incompatible high viscosity, incompatible particulate matter, corrosive aptitude, and chemical and physical instability, which leads to decomposition and sedimentation and hence short shelf life of the ink composition.

Texcharge® TC by Sericol® is a water-based discharge ink system, designed to provide maximum opacity and impact when printed on reactive dyed cottons. This system is designed for the silk or screen printing technologies, namely the compositions are thick or pasty, allowing them to pass through the mesh without feathering under masked areas.

U.S. Patent Application having publication No. 20080250967 teaches a dye discharging ink for inkjet printing which includes a reducing agent and an amine compound, wherein the reducing agent is a sulfur reducing agent such as Rongalite, and, the amine compound is an alcohol amine compound such as triethanolamine. The dye discharging ink taught therein also includes a surface active surfactant and/or a corrosion inhibitor, and the pH of the ink composition ranges from 9.5 to 11.0 so as to minimize corrosion of head nozzles due to acidic substances produced by decomposition of a reducing agent, and so as to decrease inhibition of linear advancing property of ejected ink.

The presently available ink compositions, including compositions that are suitable for inkjet printing, include aqueous-based ink compositions and non-aqueous solvent-based ink compositions. The more commonly used inkjet compositions are aqueous-based ink compositions, which typically include water and a colorant, usually a dye or pigment dispersion, and may further contain a number of additives for imparting certain attributes to the ink as it is being applied (jetted), e.g., improved stability and flow, anti-corrosiveness, and feather and bleeding resistance), as well as attributes to affect its final cured properties such as improved adhesion to the substrate (e.g., the capability to form chemical bonds with the substrate), flexibility, stretchability, softness and the like.

To ensure high quality images by inkjet, the ink composition should be characterized by free passage through the nozzles, minimal bleeding, paddling and/or smearing, uniform printing on the surface of the subject, wash-fastness, simple system cleaning and other chemical and physical characteristics. Thus, inkjet ink compositions characterized, for example, by extended chemical and physical stability, suitable viscosity, solubility, volatility, surface tension, compatibility with other components of the printing system and, in cases of continuous flow inkjet printing, electrical resistance, and further by being applied using suitable apparati, techniques and processes, are continuously sought for.

In case of printed fabrics (e.g., printed garments), in order to sustain wear and tear due to frequent use and wash cycles, the printed image on the final product, as well as the final product itself, should exhibit the properties of an elastic yet aerated film, and therefore the printed layer imparted on the substrate at the end of the printing process should be minimal, and the ink composition should also contain components which can impart such compressibility (softness), plasticity, elasticity, flexibility and stretchability.

U.S. Pat. No. 7,134,749, by the present assignee, which is incorporated by reference as if fully set forth herein, teaches a method and apparatus for color printing on a dark textile piece. IL Patent No. 162231 and WO 2005/115089, by the present assignee, which are incorporated by reference as if fully set forth herein, teach processes and systems for printing high quality, high resolution, multi-color images on fibrous or porous materials or other ink absorbing materials, or on materials having high surface tension with the ink liquid, and especially over garments, effected by applying a wetting composition prior to applying an ink composition and formation of the images.

U.S. Patent Application having Publication Nos. 20070103528 and 20070104899, by the present assignee, which are incorporated by reference as if fully set forth herein, teach individual and integrated processes, methods and compositions for printing high quality, high resolution, multi-color images on lightly and/or darkly colored fibrous or porous materials or other ink absorbing materials, which also provide a mechanism for drop immobilization aimed at inhibiting the adsorption by fabric, the bleeding, smearing, paddling and feathering of the jetted ink droplets.

U.S. Patent Application having Publication No. 2011/0032304 (recently allowed), by the present assignee, which is incorporated by reference as if fully set forth herein, teach multi-part ink compositions and integrated processes for printing high-quality and physically durable and serviceable color images on various dark or light-colored surfaces, including absorptive and non-absorptive substrates, which are especially suitable for inkjet printing on stretchable, flexible and bendable materials, and utilize inter-reactive agents which are capable of interacting upon contact therebetween on the surface of the substrate so as to effect immobilization of the liquid ink composition.

SUMMARY OF THE INVENTION

According to an aspect of some embodiments of the present invention there is provided a dye discharge composition comprising a reducing agent, a chelating agent and a first carrier, the composition being for forming a dye discharged area on a surface of a dyed substrate.

According to some of any of the embodiments of the invention, the first carrier is an aqueous carrier.

According to some of any of the embodiments of the invention, the reducing agent is a sulfur-based reducing agent.

According to some of any of the embodiments of the invention, a concentration of the sulfur-based reducing agent ranges from 300 mM to 700 mM.

According to some of any of the embodiments of the invention, the sulfur-based reducing agent is selected from the group consisting of zinc formaldehyde sulfoxylate (ZFS), sodium hydroxymethylsulfinate [also known as Rongalite, Bruggolite, sodium formaldehyde sulfoxylate, sodium oxymethylene sulfoxylate], sodium dithionite, sodium pyrosulfite (sodium metabisulfite, $Na_2S_2O_5$), sodium bisulfite ($NaHSO_3$), sodium sulfite ($Na_2SO_3$), sodium thiosulphate ($Na_2S_2O_3$), sodium sulfide ($Na_2S.9H_2O$), thyonyl chloride ($SOCl_2$), sodium formaldehyde sulfoxylate ($NaHOCH_2SO_2$) and any combination thereof.

According to some of any of the embodiments of the invention, the sulfur-based reducing agent is zinc formaldehyde sulfoxylate (ZFS).

According to some of any of the embodiments of the invention, for any of the discharge compositions disclosed herein, the chelating agent is a polyamino carboxylic acid chelating agent.

According to some of any of the embodiments of the invention, a concentration of the chelating agent ranges from 300 mM to 700 mM.

According to some of any of the embodiments of the invention, the polyamino carboxylic acid chelating agent is selected from the group consisting of ethylenediaminetetraacetic acid (EDTA), iminodiacetic acid (IDA), nitrilotriacetic acid (NTA), diethylene triamine pentaacetic acid (DTPA), Fura-2, ethylene glycol tetraacetic acid (EGTA), 1,2-bis(o-aminophenoxy)ethane-N,N,N',N'-tetraacetic acid (BAPTA), 1,4,7,10-tetraazacyclododecane-1,4,7,10-tetraacetic acid (DOTA), 1,4,7-triazacyclononane-1,4,7-triacetic acid (NOTA) and/or any salt thereof.

According to some of any of the embodiments of the invention, the polyamino carboxylic acid chelating agent is ethylenediaminetetraacetic acid (EDTA) or a salt thereof.

According to some of any of the embodiments of the invention, for any of the discharge compositions disclosed herein, a molar ratio of the reducing agent to the chelating agent ranges from 0.8 to 1.2.

According to some of any of the embodiments of the invention, for any of the discharge compositions disclosed herein a molar ratio of the reducing agent to the chelating agent is 1.

According to some of any of the embodiments of the invention, any of the discharge compositions disclosed herein has a pH that ranges from 3 to 6.5.

According to some of any of the embodiments of the invention, any of the discharge compositions as disclosed herein has a pH of 6.3.

According to some of any of the embodiments of the invention, for any of the discharge compositions disclosed herein, the composition is devoid of an amine compound.

According to some of any of the embodiments of the invention, for any of the discharge compositions disclosed herein, the composition further comprises a colorant which is impervious to the reducing agent.

According to some embodiments of the present invention, any one of the dye discharge compositions as described herein forms a part of an ink formulation which comprises a translucent colored composition.

In some embodiments, the translucent colored composition comprises a colorant, a dispersing agent and a second carrier.

According to some of any of the embodiments of the ink formulation of the invention, the translucent colored composition being such that congeals or coagulates upon contact with the dye discharge composition.

According to some of any of the embodiments of the ink formulation of the invention, the ink formulation is suitable for obtaining a dye discharged area on a dyed substrate and forming an image on the dye discharged area.

According to some of any of the embodiments of the ink formulation of the invention, the ink formulation is suitable for use in inkjet printing.

According to some of any of the embodiments of the ink formulation of the invention, the dispersed colorant is impervious to the reducing agent.

According to some of any of the embodiments of the ink formulation of the invention, the ink formulation as described herein further comprises an opaque underbase composition, the opaque underbase composition comprising an opaque white colorant, a dispersing agent and a third carrier.

According to some of any of the embodiments of the ink formulation of the invention, the opaque white colorant comprises a plurality of metal oxide particles.

According to some of any of the embodiments of the ink formulation of the invention, the metal oxide is titania.

According to some of any of the embodiments of the ink formulation of the invention, the opaque underbase composition is such that congeals or coagulates upon contact with the dye discharge composition.

According to some of any of the embodiments of the ink formulation of the invention, the dispersing agent is selected from the group consisting of a carboxylated polymer, oligomer or copolymer, a salt of an acrylic polymer, oligomer or copolymer, a salt of a styrene maleic-anhydride copolymer, and any combination thereof.

According to some of any of the embodiments of the ink formulation of the invention, the translucent colored composition and/or the opaque underbase composition further comprises independently an aqueous acrylic emulsion.

According to some of any one of the embodiments of the invention, each of the dye discharge composition, the translucent colored composition and the opaque underbase composition if present, further comprises independently at least one agent selected from the group consisting of a binder, a film-forming agent, a polymerization catalyst, a crosslinking agent, a softener/plasticizer, a surface active agent, a surface tension modifying agent, a viscosity modifying agent, a thickener agent, an anticorrosion agent and any combination thereof.

According to some of any one of the embodiments of the invention, the surface active agent is selected from the group consisting of polyether modified poly dimethyl siloxanes, polymethylalkylsiloxane, polyester hydroxyl modified polydimethyl-siloxane, a fluorocarbon/hydrocarbon anionic surfactant, a polyacrylic copolymer and any combination thereof.

According to some of any one of the embodiments of the invention, the viscosity modifying agent is selected from the group consisting of an associative thickener, a Newtonian rheology additive, a glycol, a polyethyleneglycol, a propylene glycol, a triethylene glycol, a diethylene glycol, glycerin, a high molecular weight alcohol, a carbowax, a polyvinyl alcohol, a polyvinyl pyrrolidone, and any combination thereof.

According to some of any one of the embodiments of the invention, the anticorrosion agent is selected from the group consisting of tolyltriazole (methylbenzotriazole, benzotriazole, and any combination thereof.

According to some of any one of the embodiments of the invention, each of the second carrier and the third carrier, if present, is independently an aqueous carrier.

According to an aspect of some embodiments of the present invention there is provided an ink formulation comprising any one of the dye discharge compositions as described herein, and further comprising a translucent colored composition as described herein, and optionally further comprising an opaque underbase composition as described herein.

According to an aspect of some embodiments of the present invention there is provided a process of discharging a dye from a portion of a dyed substrate, the process comprising digitally applying, by means of inkjet printing, onto the portion of the dye substrate any of the dye discharge compositions as described herein.

According to some of any one of the embodiments of the process of the invention, an average jetted drop volume of the dye discharge composition ranges from 4 picoliters to 90 picoliters.

According to some of any one of the embodiments of the process of the invention, an amount jetted of the dye discharge composition ranges from 0.005 grams per square inch to about 0.0.095 grams per square inch.

According to an aspect of some embodiments of the present invention there is provided a process of inkjet printing an image on a dyed substrate, the process comprising digitally applying by means of a plurality of inkjet printheads, onto at least a portion of a surface of the substrate, any of the dye discharge compositions as described herein, and digitally applying substantially over the portion, by means of a plurality of inkjet printheads, a colored composition, thereby forming the image.

According to an aspect of some embodiments of the present invention there is provided a process of inkjet printing an image on a dyed substrate, the process comprising digitally applying by means of a plurality of inkjet printheads, onto at least a portion of a surface of the substrate, any of the inkjet formulations described herein substantially over the portion, thereby forming the image.

According to some of any one of the embodiments of the process of the invention, the dye discharge composition is applied by at least one first printhead of the plurality of inkjet printheads and the translucent colored composition is applied by at least one second printhead of the plurality of inkjet printheads.

According to some embodiments of the present invention the process further includes, prior to applying the translucent colored composition, digitally applying an immobilization composition, if present, substantially over the portion.

According to some of any one of the embodiments of the process of the invention, the immobilization composition is applied by at least one printhead out of the plurality of inkjet printheads.

According to some of any one of the embodiments of the process of the invention, the process comprises, prior to the applying the translucent colored composition, digitally applying the opaque underbase composition, if present, substantially over the portion.

According to some of any one of the embodiments of the process of the invention, the opaque underbase composition is applied by at least one third printhead of the plurality of inkjet printheads.

According to some of any one of the embodiments of the process of the invention, an average jetted drop volume of each of the dye discharge composition, the translucent colored composition and the opaque underbase composition, if present, ranges independently from 4 picoliters to 90 picoliters.

According to some of any one of the embodiments of the process of the invention, an amount jetted of the dye discharge composition ranges from 0.005 grams per square inch to about 0.095 grams per square inch.

According to some of any one of the embodiments of the process of the invention, an amount jetted of the translucent colored composition ranges from 0.0 grams per square inch to about 0.085 grams per square inch.

According to some of any one of the embodiments of the process of the invention, an amount jetted of the opaque underbase composition, if present, ranges from 0.0 grams per square inch to 0.03 grams per square inch.

According to some of any one of the embodiments of the process of the invention, a time interval between an application of the dye discharge composition and/or the immobilization composition and an application of the translucent colored composition, and/or a time interval between an application of the dye discharge composition and/or the immobilization composition and an application of the opaque underbase composition if present, are each less than 1 second.

According to some of any one of the embodiments of the process of the invention, an application of the dye discharge composition and/or the immobilization composition, as described herein, and an application of the translucent colored composition, and/or an application of the dye discharge composition and/or the immobilization composition and an application of the opaque underbase composition if present, as described herein, is effected substantially concurrently.

According to some of any one of the embodiments of the process of the invention, the process further comprises curing the portion of the surface.

According to some of any one of the embodiments of the process of the invention, the curing is effected by heating the portion of the surface to a temperature that ranges from 130° C. to 180° C.

According to an aspect of embodiments of the present invention, there is provided a kit which includes a packaging material and having packaged therein any one of the dye discharge compositions presented herein.

According to some of any one of the embodiments of the invention, the kit is identified for use in forming a dye discharged area on a surface of a dyed substrate.

According to some of any one of the embodiments of the invention, the kit is identified for use in a method of forming an image on a surface of a dyed substrate.

According to some of any one of the embodiments of the invention, the reducing agent and the chelating agent are packaged individually within the kit.

According to some of any one of the embodiments of the invention, the first carrier is packaged together with the chelating agent and/or together with the reducing agent.

According to some of any one of the embodiments of the invention, each of the reducing agent, the chelating agent and the first carrier is packaged individually within the kit.

According to some of any one of the embodiments of the invention, the kit further includes instructions to mix the reducing agent, the chelating agent and the first carrier, so as to obtain a dye discharge composition as described herein.

According to some of any one of the embodiments of the invention, the reducing agent, the chelating agent and the first carrier are packaged together within the kit, such that the dye discharge composition is in a ready-to-use form.

According to some of any one of the embodiments of the invention as described herein for a kit, the kit further includes a translucent colored composition packaged individually within the kit.

According to some of any one of the embodiments of the invention as described herein for a kit, the kit further includes an opaque underbase composition packaged individually within the kit.

According to some of any one of the embodiments of the invention as described herein for a kit, the kit further includes an immobilization composition packaged individually within the kit.

According to some of any one of the embodiments of the invention as described herein for the kit, the kit is further identified for use in forming an image on a surface of a dyed substrate.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DESCRIPTION OF SPECIFIC EMBODIMENTS OF THE INVENTION

The present invention, in some embodiments thereof, relates to inkjet printing and, more particularly, but not exclusively, to dye discharge compositions and to uses thereof in inkjet printing.

The principles and operation of the present invention may be better understood with reference to the accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed hereinabove, there is an ever-growing need for methods and compositions for improved performance of textile inkjet technologies, particularly on challenging substrates such as colored/dyed (non-white) garment materials which are designed to bend and flex. The demands from such inkjet printed materials include sustaining repetitive washes, and maintaining a soft and light design imprint. Dye discharge techniques can produce soft and durable designs, however these techniques are limited in the spectrum of colors and resolution of the printed designs, and are typically incompatible with inkjet techniques.

While contemplating a dye discharge composition suitable for inkjet printing on colored (dyed) substrates, the present inventor has envisioned a dye discharge composition containing a dye discharge (reducing) agent which can be used in combination with a translucent colored composition that includes a colorant, such that the dye discharge composition is applied by an inkjet head on the area(s) of the substrate which are predestinated for color printing, and is followed, optionally closely, and optionally almost concomitantly, by applying the translucent colored composition on the (optionally still wet) dye-discharged areas of the substrate, thereby forming a colored image or design on the colored (dyed) substrate. Such combination could be formed in the context of a multi-part ink formulation (referred to interchangeably with the term "multi-part ink composition"), which formed in-situ on the surface of the substrate when the dye discharge composition (the dye discharge part) and the translucent colored composition (the translucent colored part), and possibly other parts, come in contact thereon.

As known in the art, discharge agents which are typically used in dye discharge compositions tend to decompose and/or degrade over a time period of less than one working day, having a typical "pot life" of about 8 hours or less than one working day. For example, a solution of a sulfur-based reducing agent such as zinc formaldehyde sulfoxylate (ZFS) in water may degrade less than one working day to form degradation products such as ZnO and ZnS, which forms as insoluble particles, while at the same time lose some or most of its dye discharge aptitude. As known in the art, small particles may cause inkjet printhead nozzles, fine tubing and capillary blockage that ultimately lead to inkjet printing device failure.

The present inventor has therefore contemplated and designed a dye discharge composition for inkjet technologies with an extended "pot life" of more than one working day, as this term is defined hereinbelow. The present inventor has envisioned a dye discharge composition which includes a discharge agent such as a sulfur-based reducing agent, and that this discharge agent can be stabilized by using a chelating agent. The present inventor has envisioned that a discharge composition having a reducing agent and a chelating agent can further be effective in the context of a multi-part ink formulation, in immobilizing a dispersed colorant in the colored ink composition.

While reducing the present invention to practice, the present inventor has formulated a dye discharge composition which has been made suitable for use in inkjet setting due to the combination of a reducing agent with a chelating agent, and further prolongs the "pot life" of the reducing agent in the composition. The combination of a reducing agent and a chelating agent has been shown to prevent the decomposition and/or degradation of the reducing agent, indicating that the composition can be used for more than one working day once open and concocted for use. In other words, the "pot life" or "shelf-life" of the dye discharge composition present invention, when kept in normal ambient conditions of light, temperature, relative humidity and pressure, is extended to more than 24 hours, and in some embodiments up to four weeks and even up to one year.

It is noted herein that most chemicals, and particularly reactive substances such as reducing agents, are more stable as dry solids compared to their dissolved form, hence, in order to further prolong the shelf life of a composition comprising a reactive substance, the composition is oftentimes manufactured, shipped and stored as a mixture of premeasured dry powders ready for dissolution in a predetermined amount of a suitable solvent, or as a collection of separated containers, wherein at least the most reactive substance is packaged separately from the other ingredients/solvent(s). Typically, the term "shelf life" is used to refer to the time period from manufacturing of a packaged composition (in any form) to the time of its first use, while the term "pot life" is used to define the time period from preparation of the composition for its first use (opening a sealed container of a ready-to-use composition or combining all the ingredients and solvents of the composition) to the time point where it is no longer suitable for its intended use.

According to some embodiments, the shelf life and/or the pot life of the dye discharge composition is long enough to allow the dye discharge composition presented herein to be manufactured, stored and/or shipped to a user in a ready-for-use form, requiring no further process or preparation other than installing the composition into a printing machine.

The term "ready-for-use", as used herein, refers to a form of a composition which allows its prompt and direct use without further process, such as reacting or mixing ingredients and/or dissolving ingredients in a carrier. A ready-for-use ink composition can be installed into the printing machine and be used without any further preparation steps.

In some embodiments, one or more, or each of the ingredients of the dye discharge composition presented herein, are packaged separately, namely one or more, or each of the reducing agent, the chelating agent, the carrier and all other optional ingredients of the dye discharge composition presented herein are packaged individually within a kit. The term "kit", as used herein, refers to a single package containing any collection of items or components needed for a specific purpose, especially for use by a user or an operator. According to some embodiments of the present invention, the kit is in a form wherein some of the ingredients of any one of the compositions presented herein, are packaged individually (separately) within the kit. In such embodiments, the kit may be in a form of a collection of premeasured pure/pristine ingredients each packaged separately, and the carrier is also packaged separately. In some embodiments the carrier is absent from the kit and is added to the kit's materials by the user/operator.

As used herein throughout, the term "pot life", also referred to herein and in the art as "working life", refers to the period of time during which a composition remains suitable for use after preparing the composition. According to some embodiments of the present invention, the "pot life" of a composition is measured from the time of opening a container of, and exposing, a composition in a ready-for-use form to ambient conditions. Further according to some embodiments of the present invention, the "pot life" of the discharge composition is measured from the moment of its initial preparation, namely dissolving the reducing agent in the carrier of the composition, to the time it is no longer usable for inkjet methods. It is noted that at least some of the discharge compositions provided herewith are suitable for inkjet methodologies wherein the ink composition is used sparsely over a working day, or otherwise the ink compositions are kept loaded in the printing machine for period of time of more than one working day.

As used herein, the term "shelf life", also referred to as "storage life", refers to the period of time in which a material or a composition can be stored and continue to meet specification requirements, remaining suitable for its intended use. For example, the shelf life of a reducing agent in its dry form may extend the shelf life of the reducing agent in its dissolved form, which may be its ready-for-use form. In such case the shelf life of that reducing agent exceeds its pot life.

In some embodiments of the present invention, the shelf life of the dye discharge composition refers to the time period during which the dry ingredients can be stored separate from a carrier/solvent, e.g., in a kit, while the pot life of the discharge part refers to the time period during which the reducing agent in already dissolved in the carrier/solvent and is in its ready-for-use form.

Accordingly, the present inventor has devised and successfully prepared and practiced a stabilized dye discharge composition suitable for use in combination with any ink composition for printing an image on a colored/dyed substrate.

In some embodiments, the dye discharge composition is stabilized by using a chelating agent at substantially equimolar amount relative to the reducing agent, which prevents or substantially retards the decomposition of the reducing agent which effects dye discharge in the substrate. In some embodiments, such a dye discharge composition is further formulated to have a low pH level. Such low pH dye discharge compositions can be further utilized to effect rapid coagulation, congelation or otherwise immobilization of a colored ink composition, as described hereinbelow.

It is further noted that any one of the discharge compositions described herein can also be further utilized for immobilizing a colored ink composition, when used in the context of a multi-part ink formulation, designed for printing an image on a colored substrate, as further discussed hereinbelow.

According to an aspect of the present invention, there is provided a dye discharge composition which comprises a reducing agent, a chelating agent and a carrier, referred to herein as a "first carrier". According to some embodiments of the present invention, the dye discharge composition is suitable for forming a dye discharged area on a surface of a dyed substrate. Such a dye discharge ink composition is particularly suitable for use in industrial inkjet printing setting wherein extended pot life is required.

As used herein, the phrase "dyed substrate", which is also referred to herein interchangeably as a "dyed surface", a "colored substrate", a "colored surface", and a "darkly-colored surface", refers to a substrate, or a surface of a substrate, having any color which is not white (non-white), such as for example, a yellow substrate, a gray substrate, a red substrate, a black substrate and the likes. According to some of any of the embodiments of the present invention, the lightness of a darkly-colored substrate or of its surface has a color which is attributed an L* (lightness) value of 50 or less and any a* and b* values on the L*a*b* scale, as discussed hereinabove and further detailed hereinbelow.

It is noted herein that any of the dye discharge compositions presented herein is useful also for printing color images of surfaces of lightly-colored substrates. Such dye discharge treatment is useful for obtaining a full spectrum of vivid colors in a colored image. Hence, according to some embodiments of the present invention, the lightness of a lightly-colored substrate or of its surface has a color which is attributed an L* (lightness) value of at least 50 and any a* and b* values on the L*a*b* scale, as discussed hereinabove and further detailed hereinbelow.

As used herein throughout, the term "L*a*b*" or "Lab*" refers to the CIE L*a*b* (International Commission on Illumination or Commission Internationale d'Eclairage, CIE) color model. Used interchangeably herein and throughout, CIE L*a*b*, L*a*b* or Lab is the most complete color model used conventionally to describe all the colors and shades which are typically visible to a normal human eye. The three parameters in the model define a particular color, whereas the lightness of the color is represented by the parameter L*, wherein L*=0 corresponds to black and L*=100 corresponds to white. The value between true magenta and true green is represented by the parameter a*, wherein a negative value indicates green and a positive value indicates magenta. The value between true yellow and true blue is represented by the parameter b*, wherein a negative value indicates blue and a positive value indicates yellow.

According to some of any of the embodiments of the present invention, the carrier of the dye discharge composition (the first carrier) is an aqueous carrier. In some embodiments, the carrier is water (e.g., deionized water).

Any of the dye discharge composition disclosed herein is suitable for use in inkjet setting due to the combination of a reducing agent with a chelating agent, which prolongs the lifetime of the reducing agent. Reducing agents that are typically used in dye discharge composition typically decompose and/or degrade over a time period of less than one working day (about 8 hours). When the reducing agent decomposes and/or degrades, it typically forms sediments which are harmful for inkjet nozzles and fine tubing and capillary parts. The combination of a reducing agent and a chelating agent, according to embodiments of the present invention, prevents the decomposition and/or degradation of the reducing agent such that the composition can be used for more than 8 hours. In some embodiments, when kept in normal ambient conditions of light, temperature, humidity and pressure, any of the dye discharge composition is good for use in inkjet settings from the moment of its initial preparation (e.g., dissolving the reducing agent in the carrier) for more than 24 hours, or more than 2 days, more than 5 days, more than 1 week, more than 2 weeks, more than 1 month, more than 2 months, more than 6 months and even more than a year.

According to some of any of the embodiments of the present invention, the reducing agent is a sulfur-based reducing agent. Like other reducing agents, sulfur-based reducing agents are capable of causing a dye to lose its light interaction properties such that it appears to change color or become colorless. Such processes are also known as bleaching in the broad sense of the term, as discussed hereinafter.

The color of a substance (a substrate or a surface thereof) is typically a result of light interacting with compounds called chromophores. Chemical bleaching may be effected by oxidation or reduction of the chromophores such that these compounds no longer interact with light in the same manner as before the bleaching reaction. Hence, in the context of embodiments of the present invention, bleaching is used to refer to the result of loss of color or elimination of the ability of the chromophore to absorb and/or reflect visible light, regardless of the effector being an oxidizing or a reducing agent.

Without being bound by any particular theory, a dye discharge reaction, or bleaching, is most effective for a dye that has a chemical structure based on long pi-conjugated systems which include reduction-susceptible double bonds, such as found in many azo-based dyes.

The term "azo dye", as used herein, refers to a compound which exhibits at least one R—N=N—R' group, in which R and R' are aryl, heteroaryl, alkyl or alkenyl.

The term "sulfur-based reducing agent", as used herein, is meant to encompass substances that contain a sulfur-containing moiety. In some of any of the embodiments described herein, the sulfur-containing moiety is a hyposulfite moiety, which is a form of sulfur oxyanion. The term "hyposulfite moiety", according to embodiment of the present invention, is meant to encompass moieties which include a [R—SO$_2$]$^-$ group, wherein R may be an SO$_2^-$ group, an —SH group, a —CH$_2$—SH group, a —S$^-$ group, a —CH$_2$—S$^-$ group, an —OH group, a —CH$_2$—OH group, a —O$^-$ group, a —CH$_2$—O$^-$ group, as well as to encompass moieties which include a [R—SO$_3$]$^-$ group, with R being as defined hereinabove.

Exemplary sulfur-based reducing agents include, without limitation, zinc formaldehyde sulfoxylate (Zn(HOCH$_2$SO$_2$)$_2$, also known as Decroline, Decolin, Safolin and ZFS), sodium hydroxymethylsulfinate (NaHOCH$_2$SO$_2$, also known as Rongalite, Bruggolite, sodium formaldehyde sulfoxylate, sodium oxymethylene sulfoxylate), sodium dithionite, sodium pyrosulfite (sodium metabisulfite, Na$_2$S$_2$O$_5$), sodium bisulfite (NaHSO$_3$), sodium sulfite (Na$_2$SO$_3$) and sodium thiosulfate (Na$_2$S$_2$O$_3$) and any combination thereof. Sulfur-based reducing agents may also include, according to some embodiments of the present invention, sodium sulfide (Na$_2$S.9H$_2$O) and thionyl chloride (SOCl$_2$), which do not contain a hyposulfite moiety, but contain sulfur and exert a reducing effect. According to some of any one of the embodiments described herein, the sulfur-based reducing agent is zinc formaldehyde sulfoxylate (ZFS or Decrolin).

It is expected that during the life of a patent maturing from this application, many relevant sulfur-based reducing agents will be developed and the scope of the term "sulfur-based reducing agent" is intended to include all such new agents a priori.

In some of any one of the embodiments described herein, the concentration of the sulfur-based reducing agent ranges from 300 mM to 700 mM, or alternatively the range is 350-650 mM, or 400-600 mM. According to some embodiments, the concentration of the sulfur-based reducing agent is 500 mM, however, it should be noted that other concentrations are contemplated.

As stated herein, reducing agents, and particularly sulfur-based reducing agents, are prone to decomposition and degradation which leads to the formation of water-insoluble particulate species, which is harmful and unacceptable in inkjet settings. In order to overcome these limitations, the present inventor has contemplated the addition of a chelating agent. According to some of any one of the embodiments described herein, the chelating agent is a member of the family of polyamino carboxylic acid chelating agents.

The phrase "chelating agent" or the term "chelant", as these terms are used herein interchangeably, refer to chemical compounds that form soluble, complex molecules with certain metal ions, inactivating the ions so that they cannot react with other elements or ions in solution, thereby preventing precipitates thereof. In some of any one of the embodiments described herein, the chelating agent is a polydentate, namely a chelating agent having at least 2, at least 3, at least 4, at least 5 or at least 6 of atoms (ligands) in a chelant that bind to a single metal ion in a coordination complex. For example, some polyamino carboxylic acid chelating agents are tetra-, penta- or hexadentates.

The term "precipitation", as used herein, refers to the process of insolubilization of dissolved species.

The terms "soluble", "insolubilization" and any other expressions that refer to solubility are made, according to some embodiments of the present invention, in the context of the carrier, e.g., an aqueous carrier.

According to some of any one of the embodiments described herein, the chelating agent is a member of the family of polyamino carboxylic acid chelating agents.

The phrase "polyamino carboxylic acid", as used herein, refers to a chelating agent containing one or more amino groups, at least one of the amino group has one or more carboxyl group-containing moiety attached thereto (directly or indirectly), such that the agent contains at least two (e.g., 2, 3, 4, 5, and 6) carboxyl groups, and encompasses also polyamino carboxylic acid salts. Due to their multi-ionic state, namely the capacity to exhibit a formal charge of more than one, the salts of polyamino carboxylic acid chelating agents may include one or more cations. Hence, the salts of polyamino carboxylic acid chelating agents comprise the negatively charged chelant as the anion, and one or more monovalent metallic cations, each interacting with one carboxylate group, or divalent or trivalent cations which interact with more than one carboxylate groups.

According to some of any one of the embodiments described herein, the chelating agent used in the dye discharge composition presented herein, exhibits at least two 2-aminoacetic acid moieties, or at least one 2,2'-aminodiyldiacetic acid moiety. For example, 1,4,7-triazacyclononane-1,4,7-triacetic acid (NOTA) exhibits three 2-aminoacetic acid moieties, and ethylenediaminetetraacetic acid (EDTA) exhibits two 2,2'-aminodiyldiacetic acid moieties.

According to some of any one of the embodiments described herein, the polyamino carboxylic acid chelating agent is having the general formula I:

X—Y—Z                                                         Formula I wherein:
X is Z or absent;
Y is a substituted or unsubstituted alkyl, preferably having 1-8 carbon atoms and which may be interrupted by one or more O, N or S atoms or absent; and
Z is an amine-containing moiety substituted by two or more carboxylic acid-containing moieties.

In some embodiments, the amine-containing moiety is simply an amine.

As used herein, the term "amine" describes a —NR'R" group where each of R' and R" is independently hydrogen, alkyl, cycloalkyl, aryl or heteroaryl, as these terms are defined herein.

As used herein, the term "carboxyl" refers to a —C(=O)OH group, and intends to encompass the term "carboxylate" which refers to the salt —C(=O)O⁻cation⁺), and the ester (—C(=O)OR thereof, wherein R is alkyl, cycloalkyl, aryl or heteroaryl, as these terms are defined herein.

In some embodiments, the amine-containing moiety is N—R'—N alkyl-diamino group.

In some embodiments, the carboxylic acid-containing moiety is simply a carboxylic acid group or a salt thereof (—C(=O)OH or —C(=O)O⁻cation⁺), which is used interchangeably with the term "carboxyl" and "carboxylate" respectively.

In some embodiments, the carboxylic acid-containing moiety is R"—C(=O)OH, wherein R" is a substituted or unsubstituted alkyl, alkenyl or alkynyl, each having, preferably, 1-8 carbon atoms and may be interrupted by one or more O, N or S (or any other heteroatoms), aryl, or heteroaryl, as there terms are defined herein.

According to some of any one of the embodiments described herein, the chelating agent used in any one of the dye discharge compositions presented herein, exhibits thiocarboxyl groups.

In some embodiments, Z is represented by the general formula II:

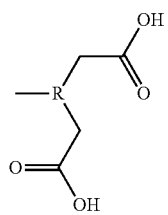

Formula II wherein R may be:
an amino group (N); and
an N—R'—N alkyl-diamino group, whereas R' is a substituted or unsubstituted alkyl, preferably having 1-8 carbon atoms and which may be interrupted by one or more O, N or S atoms.

Exemplary polyamino carboxylic acid chelating agents which are suitably used in the context of any one of the embodiments described herein include, without limitation, ethylenediaminetetraacetic acid (EDTA), iminodiacetic acid (IDA), nitrilotriacetic acid (NTA), diethylene triamine pentaacetic acid ("pentetic acid", DTPA), Fura-2, ethylene glycol tetraacetic acid (EGTA), 1,2-bis(o-aminophenoxy) ethane-N,N,N',N'-tetraacetic acid (BAPTA), 1,4,7,10-tetraazacyclododecane-1,4,7,10-tetraacetic acid (DOTA), 1,4,7-triazacyclononane-1,4,7-triacetic acid (NOTA) and/or any salt thereof.

Other chelating agents which are suitably used in the context of any one of the embodiments described herein include citric acid, 1,4,7-tris(2-methoxyethyl)-1,4,7-triazonane, tri(1-pyrazolyl)borohydride and pyrophosphates such as $P_2O_7$ ($Na_2H_2P_2O_7$).

As discussed hereinabove regarding the polyamino carboxylic acid chelating compound as containing multiple acid/case ionizable groups, it is further noted that any one or more of the carboxylic acid groups of any of the contemplated polyamino carboxylic acid chelating agents, is optionally being in a salt form thereof. The salt as being a carboxylate anion and a cation such as metallic cation (hence, —C(=O)O⁻cation⁺), whereas the cation may be an alkali metal cation or any other metallic cation. It is further noted that any one or more of the amine (amino) groups of any of the contemplated polyamino carboxylic acid chelating agents, is optionally being in a salt form thereof. The salt can be an ammonium cation and an anion (hence, —N⁺anion⁻), whereas the anion may be a halide anion (e.g., Cl⁻, Br⁻) or any other organic or inorganic anion.

It is noted herein that any of the polyamino carboxylic acid chelating agents contemplated for use in the context of embodiments of the present invention, are characterized by at least two carboxylic acid groups (or salts thereof), hence may be found in the fully protonated form (typically positively charged at low pH due to protonation of the amine-containing group and the carboxylic acid group), the fully deprotonated form (typically negatively charged at high pH due to deprotonation of the carboxylic acid groups), and any intermediate partially protonated/deprotonated form. As such, some polyamino carboxylic acid chelating agents, by virtue of having multiple weak acid/base ionizable groups, exhibit more than one acid/base dissociation constants ($K_{a/b}$) and may thus serve as pH buffering agents, wherein the pH of an aqueous solution containing the same, is essentially constant while the various protonated/deprotonated forms are in a dynamic equilibrium.

It is expected that during the life of a patent maturing from this application, many relevant polyamino carboxylic acid chelating agents will be developed and the scope of the term "polyamino carboxylic acid chelating agent" is intended to include all such new agents a priori.

According to some of any one of the embodiments of the present invention, the polyamino carboxylic acid chelating agent is ethylenediaminetetraacetic acid (EDTA) or any salt thereof, as described herein. While a free acid EDTA may be denoted by $H_4EDTA$, exemplary sodium salts of EDTA include monosodium EDTA or NaEDTA which is equivalent to $EDTA^{1-}$, disodium EDTA or $Na_2EDTA$ which is equivalent to $EDTA^{2-}$, trisodium EDTA or $Na_3EDTA$ which is equivalent to $EDTA^{3-}$, and tetrasodium EDTA or $Na_4EDTA$ which is equivalent to $EDTA^{4-}$. Exemplary acid protonated EDTA forms include $H_5EDTA^+$, wherein one of the amino groups is protonated, and $H_6EDTA^{2+}$, wherein both the amino groups are protonated.

It is noted herein that like EDTA, a similar variety of protonated/deprotonated forms (salts) are typical for other polyamino carboxylic acid chelating agents contemplated for use in the context of any one of the embodiments of the present invention.

In some of any one of the embodiments described herein, the dye discharge composition presented herein contains a chelating agent at a concentration that corresponds with the concentration of the reducing agent, as described hereinbelow. Such compositions exhibit an effective and efficient balance between inactivation and prevention of precipitation of the reducing agent, and an extended pot life of the composition.

For example, the dye discharge composition presented herein may contain a chelating agent at a the concentration that ranges from 300 mM to 700 mM, or alternatively the range is 350-650 mM, or 400-600 mM, including any value and/or intermediate subranges within these ranges. According to some of any one of the embodiments described herein, the concentration of the chelating agent is 450 mM, however, it should be noted that other concentrations are contemplated.

In embodiments where the pH of the dye discharge composition is not adjusted by an additional acid/base, the pH level of the dye discharge composition corresponds with the relative concentrations of chelating agent, namely pH level of the dye discharge composition, corresponds to the concentration and nature of the chelating agent, and inter alia corresponds with the number of weak acid/base ionizable groups. The number and type of weak acid/base ionizable groups may further affect the pH as well as the molar ratio of the reducing agent to the chelating agent, as discussed hereinbelow.

It is noted herein that the pH of the dye discharge composition may therefore be adjusted by using a combination of protonated/deprotonated forms of the chelating agent (different salts thereof such as a mono-cation salt, a di-cation salt, a tri-cation salt and the likes), as well as be adjusted by using an acid or a base (or any pH-adjusting agent) which are not salts of the chelating agent (e.g., acetic acid, ammonia and the likes). One may also select a chelating agent with a desired ratio of acid/base groups to effect desired pH adjustment.

According to some of any one of the embodiments described herein, the molar ratio of the reducing agent to the chelating agent ranges from 0.8 to 1.2. Alternatively, the ratio ranges from 0.85 to 1.05 or from 0.9 to 1.0. According to some any one of the embodiments described herein, the molar ratio of the reducing agent to the chelating agent is 1. The molar ratios described in these embodiments can be effected with any one of the reducing agents and chelating agents and any possible combination thereof.

When used in the context of an inkjet printing setting, the pH of any liquid entering the printing system has an effect on many factors, including the behavior (reactivity) of other liquids and components of the ink composition, corrosion of parts of the printing machine, the environment where the printing process takes place, and the stability of the end-product, namely the integrity and colors of the formed image and the substrate it is applied on. It is noted that some printhead manufacturers recommend using ink compositions at a pH range of 3-11. Nonetheless, when carefully balanced, an acidic dye discharge composition may present desired performance.

Hence, according to some of any one of the embodiments of the present invention, a dye discharge composition as presented herein, is characterized by a pH that ranges from 3 to 6.5. According to some embodiments, the pH range is 4-5, 5-6 or 6-6.5. Alternatively, the pH is 4.5, 5, 5.5, 6, 6.1, 6.2, 6.3, 6.4 or 6.5, or any intermediate value within these values.

According to some of any one of the embodiments of the invention, any one of the dye discharge composition described herein is devoid of an amine compound. According to some embodiments, a dye discharge composition as presented herein is devoid of an amine compound, wherein the amine compound exhibits no positively charged metallic counter-ion in aqueous solutions, such as sodium or potassium cation. According to some embodiments, any of dye discharge composition presented herein is devoid of an amine compound, such as aliphatic amines which include, without limitation, isopropylamine, n-hexylamine, didecylamine, dioctylamine and tri-N-octylamine, as well as devoid of aromatic amines, and devoid of alkanolamines or alcohol amines such as triethanolamine.

In some of any one of the embodiments described herein, when kept in industry-acceptable ambient conditions of light, temperature, relative humidity and pressure, any one of the dye discharge compositions presented herein is suitable for use in inkjet settings from the moment of its initial preparation (e.g., dissolving the reducing agent in the carrier) for more than 1 hour, more than 4 hours, more than 8 hours, more than 12 hours, more than 24 hours, more than 3 days, more than 7 days, more than 2 weeks, more than 4 weeks, more than 2 months, more than 4 months, or more than 6 months and even more than a year. In other words, the pot life of the dye discharge compositions presented herein ranges from more than 24 hours to a year or longer. Specifically, according to some embodiments, the dye discharge composition exhibits a pot life of more than 24 hours, more than one week, more than 4 weeks or more than 6 months.

According to some embodiments, acceptable conditions of light, temperature, relative humidity and pressure include, without limitation: ambient pressure of about 1 atmosphere, ambient (room) temperature of about 20-26° C., relative humidity in the range of about 30-50%, no direct sunlight and visible light of about 55-165 lux, while ultraviolet (UV) radiation is less than 75 μW/l. It is noted that other values for light, temperature, relative humidity and pressure are contemplated. It is noted that any of the dye discharge compositions presented herein are suitable for use in inkjet settings also when kept under less than optimal storage conditions for more than 1 hour, more than 4 hours, more than 8 hours, more than 12 hours, more than 24 hours, more than 3 days, more than 7 days, more than 2 weeks, more than 4 weeks, more than 2 months, more than 4 months, or more than 6 months, such as high temperature and humidity, up to 25° C., 30° C., 35° C., 40° C., 45° C., 50° C., 60° C., 70° C. and higher, and relative humidity of up to 60%, 70%, 80%, 90% or higher.

According to some embodiments of the present invention, any one of the dye discharge compositions presented herein, is formulated with a carrier (solvent). According to some of any one of the embodiments of the present invention, the carrier of the dye discharge composition is an aqueous carrier. In some embodiments, the carrier is water (e.g., deionized water). In the context of a multi-part ink formulation discussed hereinbelow, the carrier of the dye discharge composition is referred to herein as "first carrier".

Any one of the dye discharge compositions described herein may include additional ingredients, such as for example, surface active agents, surface tension modifying agents, viscosity modifying agents and humectants, as these are discussed and exemplified hereinbelow and in the following Examples section, and further include optional binders, film-forming agents, polymerization catalysts, cross-linking agents, softeners/plasticizers, thickeners, anticorrosion agents and any combination thereof. It is noted herein that some agents may serve more than one purpose; for example, a viscosity modifying agent may also serve as a humectant and/or a surface tension modifying agent and/or a surface active agent and, the likes.

Any one of the dye discharge compositions described herein may further include agents for effecting immobilization of another ink composition, as discussed hereinbelow. Such dye discharge composition that includes agents for effecting immobilization of another ink composition is useful in the context of a multi-part ink composition as discussed hereinbelow. However, it is noted herein that any of the dye discharge compositions presented herein may be used in the context of any inkjet formulation, as well as one which is not designed to effect or undergo immobilization.

Unless mentioned otherwise, the dye discharge composition does not contain a colorant and is thus substantially transparent and colorless and intended to leave a bleached-out area on the substrate but not to change the original color to the substrate's material.

When discharging a dyed substrate, the dye discharged area of the substrate may lose all the dye coloring and exhibit the original color of the substrate material. For example, if the substrate is a dyed cotton fabric, after effecting a dye discharge reaction using the dye discharge composition presented herein, the dye discharge area may become yellow, pale yellowish to beige or grayish yellow color. It is noted that substrate bleaching reaction typically refers to the augmentation of the natural color of the substrate, rather than augmentation of the dye in a dyed substrate, which is typically referred to as a dye discharge reaction. According to embodiments of the present invention, the dye discharge composition may be used to augment and change the original color of the substrate, namely to effect a bleaching reaction as well as a dye discharge reaction.

Hence, in some embodiments of the present invention, any of the dye discharge compositions presented herein may further include a colorant or a dye which is impervious to the bleaching effect of the reducing agent, allowing the dye discharge composition to impart a pre-selected color to the bleached areas of the substrate. In some of these embodiments, the dye discharge compositions presented herein may contains a discharge-impervious colorant or dye, such as described, for example, in U.S. Pat. Nos. 4,623,476, 4,474,677, 4,554,091, 4,271,030, 4,464,281, 4,714,562 and 5,089,162.

In some embodiments, the dye discharge compositions presented herein may further include a dispersed colorant/pigment, and in some embodiment may include a colorant/pigment which is dispersed in a film-forming binder and/or an adhesion promoting agent that subsequently forms the printed image on the substrate, as these are discussed further hereinbelow.

An exemplary dye discharge composition, according to some embodiments of the present invention, is demonstrated in the Examples section that follows below.

According to some embodiments of the present invention, any of the dye discharge compositions presented herein may form a part (e.g., a first part) of a multi-part inkjet formulation which further includes a translucent colored composition (e.g., a second part), or may be combined with a translucent colored composition for forming an ink formulation (which is used for printing an image). According to other embodiments of the present invention, any of the dye discharge compositions presented herein may form a part of a multi-part inkjet formulation which includes an opaque underbase composition for obtaining a desired background for the printed image (e.g., a third part), and further includes a translucent colored composition for forming the image.

In the context of embodiments of the present invention, the multi-part ink formulation is obtainable utilizing any one of the dye discharge compositions presented herein. The ink formulation is obtainable, according to some embodiments, by contacting the dye discharge composition with a translucent colored composition on the surface of a substrate, which contacting is also referred to herein as "combining in-situ". According to some embodiments, the ink formulation is also obtainable by contacting any one of the dye discharge compositions as described herein with an opaque underbase composition and further contacting with a translucent colored composition on the surface of a substrate.

According to an aspect of some embodiments of the present invention there is provided a multi-part ink formulation, which is formed by contacting, or combining in-situ, any one of the dye discharge compositions described herein as one part, and a colored ink composition as a second part. In some embodiments, the compositions are suitable for use in inkjet printing and therefore as an inkjet formulation, or a multi-part inkjet formulation.

In some embodiments, the color composition is any color composition suitable for use in inkjet printing.

In some embodiments, the color composition is a translucent colored composition.

In some embodiments, the translucent colored composition may be the same or resemble, at least in some characteristics and ingredients, many standard and common inkjet compositions.

According to some of any one of the embodiments described herein, the translucent colored composition comprises a colorant, a dispersing agent and a carrier (referred to herein as a second carrier). According to some of any of the embodiments of the present invention, the dispersed colorant/pigment, typically a cyan, magenta, yellow and black colorant (CMYK), or red, green and blue colorant (RBG), is impervious to the reducing agent of the dye discharge composition.

According to some of any one of the embodiments of the ink composition or formulation of the present invention, the second carrier is an aqueous carrier. In some embodiments, the second carrier is water.

In order to obtain a sharp and vivid image by inkjet in the form of a film attached to a surface of a substrate, the film should be made from fine and distinct points of colors, corresponding to pixels of a digital image or the grain of a photographic paper coated with light-sensitive chemicals. These distinct points of colors stem from very fine droplets of the translucent colored composition which are jetted onto the substrate during the printing process, and the finer the droplets remain on the substrate after ejection, the finer the image would be. The droplets will remain fine if feathering, bleeding and smearing can be limited.

As discussed hereinabove, the way to afford a sharp image film on the substrate is to "freeze" or immobilize the droplets on contact with the substrate. Thus, a chemical and/or physical change takes effect in the ink composition upon contacting thereof with the substrate, and this chemical and/or physical change is effected by contacting agents in various compositions, which are designed to afford the immobilization of the inkjet droplets on the substrate, which will eventually lead to better and sharper images.

While reducing the present invention to practice, the inventor had contemplated that any one of the dye discharge compositions presented herein may also serve to effect immobilization of the translucent colored composition, if the latter comprises substances that congeals or coagulates upon contact with the dye discharge composition. Hence, according to some of any one of the embodiments of the present invention, any one of the translucent colored composition as described herein and any one of the dye discharge compositions as described herein are formulated such that the colored composition congeals or coagulates upon contact with the dye discharge composition, thereby forming an immobilized plurality of ink dots on the dye discharged area of the dyed substrate, thereby collectively form an image thereon.

According to some embodiments, the dye discharge composition has a pH lower than 7, or lower than 6.5, as described herein, and the translucent colored composition is selected such that the acidic nature of the discharge composition serves also to effect immobilization of the translucent colored composition.

The term "immobilization", as used in the context of embodiments of the present invention, refers to the act of restriction or substantial limitation of flowability of a liquid, namely substantial reduction of the capability of a liquid to move by flow. For example, immobilization of a liquid can be effected by congelation of the liquid or solutes therein. Immobilization of droplets of liquid ink can be achieved, for example, by elevating the viscosity of the liquid ink composition such that the droplets are restricted from flowing once in contact with the substrate. As used herein, the term "immobilization" is not meant to include final polymerization and print fixation by crosslinking and curing reactions.

Quantitatively, "immobilization" in the context of embodiment of the present invention is defined as elevating the viscosity of the color-bearing parts of the ink composition by 10-folds, 50-folds, 100-folds, 500-folds 1000-folds or 2000-folds and more. For example, when a given color-bearing part is characterized by having a viscosity of 10-13 cp, it is defined as immobilized when its viscosity is elevated to about 2000 cp or higher as a result of congelation.

Hence the chemical and/or physical change, which effects the aforementioned immobilization droplets of liquid ink, according to some embodiments of the present invention, is congelation. The term "congelation", as used herein throughout, is synonymous to the terms "coagulation", "thickening" or "gelation", and refer to the sharp decrease in fluidity of a formerly fluid liquid. Congelation can be effected also by sedimentation, precipitation, partial solidification and partial polymerization of soluble constituents in the composition. The term "coagulation", as used herein throughout, refers to the destabilization of suspended colloidal or emulsified substances. The term "flocculation", as used herein, refers to the bridging between particles by a polymer chain, causing them to form flocs or larger aggregates that may sediment or precipitate.

Since the bleaching process may leave a residual tint or color in the dye discharge areas of the substrate, these areas may require a coat of an opaque white colorant so as to serve as an underbase for the translucent colored composition, thereby allowing the printed image to exhibit a full and vivid spectrum of colors which are obtained when basic translucent CMYK or RGB colors are printed together. Hence, according to some of any one of the embodiments of the present invention, any one of the dye discharge composition presented herein, and any one of a colored composition as described herein, is used in combination with an opaque underbase composition.

According to some of these embodiments, the opaque underbase composition comprises an opaque white colorant, a dispersing agent and a third carrier.

According to some embodiments of the present invention, an inkjet formulation which is formed in-situ on the substrate, comprises any one of the dye discharge compositions as presented herein, and an opaque underbase composition, as described herein. Such an inkjet formulation is also referred to herein as a multi-part ink formulation.

According to some embodiments of the present invention, the third carrier is an aqueous carrier. In some embodiments, the third carrier is water.

An exemplary translucent colored composition, according to some embodiments of the present invention, includes at least three functional components:

A matrix composed of water, humectants and an emulsified polymer;

Dispersed pigment particles (60-120 nm diameter); and

A dispersing agent (dispersant) based on carboxylic polymer.

Dispersing polymers, according to some embodiments of the present invention, are soluble in basic (pH greater than 7) aqueous solutions. It is assumed that the dispersing polymer coats the pigment particles to keep them from aggregation, and it is thus this dispersing agent which is the target of the immobilization process. The reducing agents are very potent in decomposition of dyes by breakage of the double conjugated bonds, however they do not bleach CMYK solid pigment particles.

According to some embodiments, the opaque white colorant, which is suitable for forming an opaque underbase for the translucent colorants, is a plurality of metal oxide particles, and according to some embodiments of the present invention, the metal oxide is titania, although other oxides are contemplated, such as alumina.

In some embodiments, the opaque underbase composition is designed to congeal or coagulate upon contact with the dye discharge composition.

In some embodiments, the opaque underbase composition is designed to congeal or coagulate upon contact with the dye discharge composition, as a result of the acidic nature of the dye discharge composition, as described herein.

In some embodiments, the opaque underbase composition is designed to congeal or coagulate upon contact with the dye discharge composition, as a result of the presence of divalent cations in the dye discharge composition, as described herein.

The ability of various compositions to congeal or coagulate, or otherwise lose fluidity and become immobilized on the surface of the substrate, is afforded by selecting specific ingredients for the translucent colored composition and/or the opaque underbase composition.

According to some of any one of the embodiments described herein, the dispersing agent in the translucent colored composition and/or the opaque underbase composition is sensitive to low pH (e.g., lower than 7), and loses its capacity to disperse a colorant. Exemplary acid-sensitive dispersing agents include, without limitation, carboxylated polymers, oligomers or copolymers, salts of acrylic polymers, oligomers or copolymers, salts of styrene maleic-anhydride copolymers, and any emulsion and/or combination thereof.

According to some of any of the embodiments described herein, the dispersants include carboxylic polymer salts such as styrene maleic-anhydride copolymer salts having an average MW of 500-2000), and/or acrylic acid salts having an acid number of about 50-240 mg KOH/gram and an average MW of about 400-1500.

Once the ink formulation is formed on the substrate, and thereby congeals or coagulates thereon, other components in the various compositions may be utilized for forming a film and/or contributing to the adhesion of the film to the substrate. Such film-forming and adhesion promoting agents typically form a part of the translucent colored composition and/or the opaque underbase composition, and may be known as resin binders. According to some of any one of the embodiments described herein, the translucent colored composition and/or the opaque underbase composition further include, independently, an aqueous acrylic emulsion and/or an aqueous emulsion of an acrylic styrene binder.

According to some of any one of the embodiments of the present invention, any one of the dye discharge composition, the translucent colored composition and the opaque underbase composition as described herein may further include, independently, at least one additional/optional agent such as a binder, a film-forming agent, a polymerization catalyst, a crosslinking agent, a softener/plasticizer, a surface active agent, a surface tension modifying agent, a viscosity modifying agent, a thickener agent, an anticorrosion agent and any combination thereof.

According to some embodiments of the invention, the ingredients in the compositions presented herein (typically in the translucent colored or opaque composition), which impart mechanical characteristics to the final image film are selected such that they form an elastic and stretchable film. Typically, the major agent which imparts this property is referred to as a film-forming agent. Optionally or additionally, the elastic stretchability is imparted by additional binders, cross-linking agents, softeners, plasticizers and the likes. As discussed herein, when these constituents are mixed and/or co-polymerize and/or crosslink and/or cure and thereby affix to the substrate, a soft, flexible and stretchable elastic film is formed which is characterized by a relatively low Tg.

The phrase "film-forming agent", as used herein, refers to a bonding/binding agent (binder) which polymerizes, cross-links to itself or crosslinks via a crosslinking agent, and affords a film or a layer upon application, optionally upon drying and curing thereof on a surface. As known in the art, film-forming agents are a group of chemicals that afford a pliable, stretchable, cohesive, and continuous or semi-continuous covering film or layer over a surface when applied thereon and allowed to undergo a chemical or physical transition. The chemical or physical transition may be setting, polymerizing, drying, heating, curing, crosslinking and the likes. The phrase "film-forming agent", encompasses coating agents, binders, adhesives, adhesion-promoting agents, resins, polymers, co-polymers and the like collectively.

Non-limiting families of film-forming agents include monomers, oligomers (short chains of about 10-100 monomers), polymers and copolymers of acrylates, acrylamides and other derivatives of acrylic acid, acryl/styrene, polyethylene-glycols, polyvinyl-alcohols, urethanes and polyvinylpyrrolidones, and the likes also in the form of resin emulsions and co-emulsions. These film-forming agents can also be selected to have a relatively low Tg, thereby affording an image which is stretchable (may be elongated without breaking).

According to some of any one of the embodiments of the present invention, the ingredients of the ink composition are selected so as to form a thin elastic film on the substrate, which constitutes the image once all the compositions converge on the substrate at the end the printing process. As used herein, the phrase "elastic film" refers to the mechanical property and form of the image, as it is formed on the substrate. This film is said to be elastic since it is formed substantially from elastomeric substances. The film, according to some embodiments of the present invention, is at least as elastic as the substrate it is affixed to.

The term "elastomeric", as used herein, refers to the mechanical properties of a rubber-like polymeric substance, which can deform under stress exerted by external forces, and can return to its original shape when the stress is removed. The elasticity of an elastomer may depend on external conditions such as temperature. Hence, according to some embodiments, the term "elastomeric" refers to mechanical properties at temperatures which are normal for human habitats, and particularly at room temperature.

Hence, the elastomeric film which constitutes the image, according to some embodiments of the present invention, is characterized by a low glass transition temperature (Tg), which allows it to form a stretchable image on a stretchable substrate at ambient conditions. The glass transition temperature (Tg) is the temperature below which amorphous materials, such as polymers, become stiff (glassy), and above which become pliable and elastic (rubbery).

"Thermoplastic" is another term which is used to describe polymeric substances which can reversibly go from a stiff state to an elastic state. As used herein, the term "thermoplastic" refers to a polymer which is sufficiently soft above a certain temperature so as to readily allow plastic deformation of the polymer, and which is sufficiently stiff below a certain temperature so as to retain a desired shape. The softening of a thermoplastic polymer often occurs at temperatures near and/or above a transition temperature (e.g., a glass transition temperature, a melting point) of the polymer. Such a transition temperature may be determined, for example, by calorimetry.

The phrase "softening temperature", as used herein, refers to the lowest temperature among the glass transition temperature range of a thermoplastic polymer. Other terms used in the art for such temperature-dependent characteristic, include the melting point of the thermoplastic resin, the temperature which brings the viscosity of the thermoplastic resin to about $10^{11}$ to $10^{12}$ poises, the pour point of the thermoplastic polymer, and the minimum film-forming temperature (MFT) in the form of an emulsion of the thermoplastic polymer.

In the context of embodiments of the present invention, the relatively low Tg of the finished image film attached to the substrate is lower than 0° C., or alternatively it ranges from about −35° C. to about 0° C., or from −35° C. to about −5° C., or from about −35° C. to about +15° C.

The property of Tg of the film is determined by the properties of its constituents, therefore a film which is elastic at relatively low temperatures, is formed from elastomers having a relatively low Tg. Hence, according to some embodiments of the present invention, the ink composition which forms can form a film which is affixed to the substrate comprises proto-elastomeric film forming constituents.

The elasticity of the elastomeric film which constitutes the image can be determined by its ability not to crack or tear when the substrate on which it is applied on is stretched. For example, an image is defined as elastic in the context of embodiments of the present invention, if maintains its shape, color composition and overall integrity (no cracks, tears or other permanent deformations) upon stretching the substrate in one direction by 30% of its original length. Alternatively, an image is defined as elastic when maintaining integrity during and after the substrate has been stretched by 50%, 75%, 100%, 150%, 200% and up to 300% for highly stretchable substrates.

Alternatively, the image is defined as characterized by an elongation percentage and a recovery percentage of elongation, when it maintains its original shape and color composition and is fully recoverable after stretching when applied on a given substrate. The elongation percentage and a recovery percentage of elongation are as defined in U.S. Pat. No. 5,874,372. Hence, the elastic image afforded according to some embodiments of the present invention, is characterized by an elongation percentage of 30% to 300% and a recovery percentage of elongation of at least 70%.

Following are descriptions and examples of various ingredients of the various compositions presented herein.

Exemplary film-forming agents include, without limitation, non-ionic water-emulsifiable resins such as acrylic polymers and copolymers, alkyl-acrylic polymers and copolymers, acrylic-styrene copolymers, polyurethanes, polyethers, polyesters, polyacrylates and some combinations thereof.

According to some embodiments of the present invention, the film-forming agent is a self-crosslinking alkyl-acrylic copolymer, and according to some embodiments, the self-crosslinking alkyl-acrylic copolymer is an ethyl-acrylic/butyl-acrylic copolymer. Some acrylic-based polymers and copolymers are emulsifiable self-crosslinking polymers which are used in the garment industry to bestow physical and chemical resistance to the cloth, knitted, woven or non-woven, against physical wear and tear due to frequent use and repeated washing, as well as against alcohol, organic solvents and water.

When selected to have a low Tg, according to embodiments of the present invention, commercially available suitable film-forming agents, which may also serve as pigment dispersants in a relevant composition, include without limitation, TEXICRYL™ 13-216 (Tg −14° C.), TEXICRYL™ 13-290 (Tg −30° C.), TEXICRYL™13-297 (Tg −9° C.) and TEXICRYL™ 13-326 (Tg −25° C.) which are commercially available from Scott Bader Ltd., and APPRETAN™ E 2100 (Tg −30° C.), JONCRYL™617 (Tg+7° C.), APPRETAN™ E 6200 (Tg −20° C.) and APPRETAN™ E 4250 (Tg −15° C.) which are commercially available from Clariant.

Other non-limiting examples of commercially available film-forming agent ACRYSOL™ series, commercially available from Rhome and Hass Ltd., and ACRONAL™ series, commercially available from BASF Inc.

Other binders, dispersants and adhesion promoters which are useful in the context of an elastomeric film-forming agent according to embodiments of the present invention include, without limitation, commercially available and widely used families of products, known under names such as Alkydal™, Desmodur™ and Desmophen™ (from Bayer); Beckopox™, Macrynal™, Maprenal™, Viacryl™ and Vialkyd™ (from Vianova Resins); Cythane™ (from Cytec); Dynapol™ and Vestanat™ (from Hiils); Johncryl™ (from Johnson); K-Flex™ (from King Industries); Synocure™ and Synolac™ (from Cray Valley); Synthalat™ (from Synthopol); Tolonate™ (from Rhone Poulenc); Uracron™ and Uralac™ (from DSM); Worleecryl™ and Worleekyd™ (from Worlee) and the likes.

It is noted that any exemplary ingredient disclosed herein is given for exemplifying purposes only, and should not be regarded as limiting to that particular ingredient or commercially available product, but rather regarded as a representative member of a wider group of alternatives, all of which are meant to be encompassed in the context of other embodiments of the present invention.

Additional optional ingredients in the various compositions presented herein include surface active agents and viscosity modifying agents.

Exemplary surface active agents include, without limitation, polyether modified poly dimethyl siloxanes, polymethylalkylsiloxane, polyester hydroxyl modified poly-dimethylsiloxane, a fluorocarbon/hydrocarbon anionic surfactant, a polyacrylic copolymer and any combination thereof.

Exemplary viscosity modifying agents include, without limitation, associative thickeners, Newtonian rheology additives, glycols, polyethyleneglycol, propylene glycol, triethylene glycol, diethylene glycol, glycerin, high molecular weight alcohols, carbowaxes, polyvinyl alcohols, polyvinyl pyrrolidones, and any combination thereof.

Exemplary anticorrosion agents include, without limitation, tolyltriazole (methylbenzotriazole, benzotriazole, and combinations thereof.

Any of the due discharge composition described herein can be provided within a kit. The kit may comprise a packaging material and a dye discharge composition as described herein packaged therein.

As discussed hereinabove, in some embodiments of some of the dye discharge composition presented herein, the reducing agent and the chelating agent are packaged individually (separately) within the kit, particularly when the dye discharge composition is intended for extended storage and requires to exhibit a long shelf life. According to some embodiments of some of the dye discharge composition presented herein, the carrier of the dye discharge composition is packaged together with the chelating agent and/or the reducing agent. In some embodiments, the carrier is packaged with the chelating agent, but not with the reducing agent which is kept as a dry solid (e.g., a powder). According to some embodiments of some of the dye discharge composition presented herein, each of the reducing agent, the chelating agent and the carrier is packaged individually and separately within the kit.

According to some embodiments of some of the dye discharge composition presented herein, the kit further includes instructions for the user/operator to mix the reducing agent, the chelating agent and the carrier, so as to obtain the dye discharge composition.

According to some embodiments of some of the dye discharge composition presented herein, the reducing agent, the chelating agent and any other optional ingredient which can be provided as a dry solid, are pre-measured, pre-mixed as a mixture of powders and packaged as a single item within the kit, while a common solvent (the carrier) is pre-measured and packaged separately within the kit, such that the dye discharge composition is formed by adding the carrier to the mixture of solids.

According to some embodiments of some of the dye discharge composition presented herein, the reducing agent, the chelating agent and the carrier are pre-mixed and packaged together within the kit, such that the dye discharge composition is in a ready-to-use form.

In some embodiments, the kit is identified as being for use in forming a dye discharged area on a surface of a dyed substrate. According to some embodiments, the kit is further identified as being for use in a method of forming an image on a surface of a dyed substrate. According to some embodiments of any or all of the dye discharge composition presented herein, the kit further includes, in addition to the dye discharge composition, a translucent colored composition packaged individually within the kit, optionally a composition as described herein.

According to some embodiments of any or all of the dye discharge composition presented herein, the kit further includes, in addition to the dye discharge composition, an opaque underbase composition packaged individually within the kit, optionally as described herein.

According to some embodiments of any or all of the dye discharge composition presented herein, the kit further includes, in addition to the dye discharge composition, a translucent colored composition and/or an opaque underbase composition, as described herein, packaged individually within the kit, and optionally further identified as being for use in forming an image on a surface of a dyed substrate.

According to some embodiments, in cases where the dye discharge composition is present in the kit in a ready-to-use form, the kit may further include instructions to use the discharge composition for time period (storage life) of more than 24 hours from the date the composition is packaged within the kit. According to some embodiments, the instructions are to use the discharge composition within a time period of more than 1, 2, 3, 4, 5, 6, 7, 8, 9, 10, and up to 40 weeks, or within a time period of more than 1 year, from the date the composition is packaged within the kit.

Any of the kits presented herein, wherein the reducing agent is packaged individually from the other ingredients of the dye discharge composition, may further include instructions to combine the reducing agent and the other ingredients of the dye discharge composition, and then use the discharge composition within a time period of more than 1 hour, more than 4 hours, more than 8 hours, more than 12 hours, more than 24 hours, more than 3 days, more than 7 days, more than 2 weeks, more than 4 weeks, more than 2 months, more than 4 months, more than 6 months or more than year. According to some embodiments, the instructions are to combine the ingredients and use the discharge composition within a time period of more than 4 weeks, or within a time period of more than 1 year.

The dye discharge composition can be prepared by a process which includes, for example:

Providing a sulfur-based reducing agent;

Providing a polyamino carboxylic acid chelating agent in one or more protonated/deprotonated forms, or salts;

Providing a desired carrier; and

Mixing in a desired carrier a sulfur-based reducing agent, in an amount to effect the desired bleaching result in the given substrate (200-500 mM); and an amount of the chelating agent as described herein (200-1000 mM) corresponding to the desired molar ratio with the reducing agent;

Adjusting the pH of the resulting solution with small amounts of a salt of the chelating agent or an acid/base; and Stirring the ingredients in the resulting solution until fully dissolved, thereby forming a ready-to-use dye discharge composition according to some embodiments of the present invention.

According to an additional aspect of some embodiments of the present invention, there is provided a process of inkjet printing an image directly on a dyed substrate (namely not by means of an image transfer element), which is based on any one of the dye discharge composition presented herein. Hence, the process is effected by digitally applying (printing), by means of a one or more inkjet printheads, directly onto at least a portion of a surface of a dyed substrate, the any of the dye discharge compositions presented herein to thereby form a dye discharged (bleached-out) area on the substrate, and further digitally applying (printing) one or more translucent colored compositions, by means of other inkjet printheads, to thereby form an image thereon.

The process may be effected by applying sequentially or concomitantly each composition from a separate printhead, namely any of the dye discharge compositions presented herein is applied by at least one designated printhead (first printhead) and the translucent colored composition is applied by at least one other designated printhead (second printhead), whereas the colored composition is applied substantially over the portion of the surface where the dye discharge composition is applied, thereby forming the image.

As discussed hereinabove, in cases where the bleached-out portion of the substrate exhibits unacceptable base color, the process of forming an image on a dye substrate further includes, prior to applying the translucent colored composition, digitally applying an opaque underbase composition, by at least one additional designated printhead (third printhead), and substantially over the portion of the surface where any of the dye discharge compositions is applied.

Since each of the various compositions used in the process presented herein is jetted by a digitally-control manner, the areas onto which each composition is applied can essentially be programmed to overlap, covering substantially the same area of the image (coextensive areas). In particular, any one of the dye discharge compositions presented herein, which is colorless and transparent in some embodiments, is applied onto the surface as a silhouette of the image, namely as a solid outline and featureless interior of the image. This effect further contributes to the reduction in the amount needed to effect immobilization of the translucent colored composition and/or the opaque underbase composition, as the dye discharge composition does not form extending margins peripheral to the image. This effect also widens the scope of suitable substances which can be used to formulate the dye discharge composition, as bleaching and staining of unprinted areas of the substrate which are not covered by colorants, is no longer a problem. The bleaching effect further contributes to the reduction in the amount of the optional opaque underbase composition needed to create a white background for the translucent colored composition. This bleaching effect also widens the scope of suitable substrates.

According to some embodiments of the present invention, the average jetted drop volume of each of the dye discharge composition, the translucent colored composition and the optional opaque underbase composition, ranges independently from 4 picoliters to 90 picoliters. Alternatively, and depending on the printing machine and required image resolution and film properties, the average jetted drop volume ranges from 4-20 picoliters or from 40-90 picoliters.

According to some embodiments of the present invention, the amount jetted of the dye discharge composition ranges from 0.005 grams per square inch to about 0.095 grams per square inch. Depending on the thickness of the dyed substrate, the type and intensity of the dye in the dyed substrate, the range of the jetted amount of any one of the dye discharge compositions presented herein may be 0.005-0.010, or 0.01-0.02, or 0.01-0.03 grams per square inch of the surface. In some embodiments, the range of the jetted amount of any one of the dye discharge compositions presented herein may be 0.03-0.095 grams per square inch.

According to some embodiments of the present invention, the amount jetted of the translucent colored composition ranges from 0.0 grams per square inch to about 0.085 grams per square inch. Depending on the substrate's texture and the required image properties, the range of the jetted amount of the translucent colored composition may be 0.01-0.020, or 0.02-0.04, or 0.04-0.06, or 0.06-0.08 grams per square inch of the surface. According to some embodiments, the amount jetted of the translucent colored composition is about 0.015 grams per square inch of the surface.

The amount jetted of the opaque underbase compositions is substantially lower than the amount jetted in equivalent processes, such as those discussed supra which do not include the dye discharge composition presented herein. Hence, according to some embodiments of the present invention, the amount jetted of the opaque underbase compositions ranges from 0.0 grams per square inch to 0.05 grams per square inch. Alternatively, the jetted amount of the opaque underbase composition may be 0.0-0.005, or 0.0-0.01, or 0.0-0.02, or 0.005-0.02, or 0.005-0.03, or 0.005-0.04, or 0.005-0.05. According to some embodiments, the amount jetted of the opaque underbase composition is about 0.009 grams per square inch of the surface, This amount is 5-to-10-fold smaller than the amount of white underbase which is required to achieve similar results on similar substrate with ink formulations which do not include the dye discharge composition presented herein.

In some embodiments of the present invention, the immobilization of the translucent colored composition and/or the opaque underbase composition, is effected by applying an immobilization composition onto the substrate, which is not necessarily the dye discharge composition presented herein. In other words, the processes presented herein may include, in addition to the step of applying the discharge composition, applying an immobilization composition. The application of the immobilization composition can be effected by the same means used to apply the discharge composition and other ink compositions, namely a designated printhead; or it can be applied by other means such as a spraying nozzle, a roller and the likes.

The immobilization composition is generally transparent/colorless, and is typically printed before or concurrently with the other ink compositions, essentially to introduce a property-adjusting agent which is the agent that effects the congelation of components in the other ink compositions. An immobilization composition typically includes a property-adjusting agent (e.g. an acid) and a carrier (e.g. water). The immobilization composition may optionally include some of the co-polymerization agent(s) which form the image together with other components in the other ink compositions.

The term "property" as used herein refers to a chemical and/or physical property of the ink composition, namely, a characteristic of the composition that is reflected by the chemical composition and/or a physical parameter of the composition. Representative examples include, without limitation, acidity (pH), metal atom complexation, dispensability, dispersibility, solubility, ionic strength, hydrophobicity, electric charge and the likes.

The aforementioned properties may be inter-dependent, namely a change in one property effects a change in another property, thereby constituting inter-dependency therebetween. An example of such inter-dependency is a pH-dependent dispersibility and ionic-strength-dependent dispersibility, wherein the change in pH (the aforementioned acidity or alkalinity property) or the ionic-strength of a solution changes the dispersibility of one or more of its dispersed species. Similarly, there exist inter-dependency between metal atom complexation combined with pH, and the capacity to stay emulsified (dispersed), and such inter-dependency is discussed in detailed hereinbelow.

The phrase "property-adjusting agent" as used herein refers to a component in the dye discharge composition and/or in the immobilization composition and can effect the level of one or more chemical or physical properties of the ink composition when these compositions come in contact and combine, such as a pH level, metal-atom-ligand complexation, dispersibility, the ionic strength, the hydrophobicity or the electric charge/valency of the combined composition. By effecting a change in one or more such properties, the property-adjusting agent is causing the property-sensitive agent to undergo a chemical and/or physical change to effect congelation and consequently immobilization of the various ink compositions, as discussed herein.

The term "property-sensitive agent" refers to a component of a composition which is sensitive to a change in a particular chemical and/or physical property of the composition and as a result of such a change undergoes a chemical and/or physical change which effects the entire composition.

Such sensitivity can manifest itself by, for example, breaking of an emulsion, an event that leads to congelation.

Property-sensitive agents can be readily affected by adding a chemical substance (the property-adjusting agent) which lowers or elevates the level of the properties listed under the term "property" hereinabove. For example, adding an acid (H+ ions) will elevate the acidity while adding a base will lower the acidity level, and thus affect a pH-sensitive agent.

Similarly adding a salt (ions of a particular valency) will elevate the ionic strength, adding a precipitating agent will lower the solubility, adding a hydrophilic agent will lower the hydrophobicity, adding a charged species will elevate the electric charge, and so on, each property can be lowered or elevated by use of a suitable adjusting agent.

Exemplary property-adjusting agents which may be use in context of embodiments of the present invention, include acids and/or bases that adjust the pH property (e.g., EDTA-based ions and/or organic acids); multi-valent metal ions (e.g., $Zn^{2+}$); metal oxides, salts that adjust the ionic strength and electrical charge; or oxidizing agents, reducing agents, radical-producing agents and crosslinking agents which change the chemical reactivity of certain chemical groups present in one or more components of the other part of the ink composition and thereby effect the solubility thereof by promoting crosslinking and/or polymerization of these components.

Some colorant dispersants, such as acrylic salts and/or emulsions thereof, lose their dispersing attribute as a result of a pH-shift. Some pH/metal-atom complexation-sensitive acrylic polymer or copolymer and/or emulsions thereof, can lose its ability to stay in an emulsified form when the pH of the liquid formulation drops below a certain level and/or when a certain metal oxide is introduced, thus effecting congelation.

According to some embodiments of the present invention, the property-sensitive agent can be in the form of, for example, an emulsified co-polymerizable agent, which will congeal on the surface of the substrate due to an interaction with the dye discharge composition and/or immobilization composition containing the property-adjusting agent. Hence, according to some embodiments of the invention, the co-polymerizable agent of the ink composition is the property-sensitive agent. Optionally or additionally, the ink composition may include additional co-polymerizable agent(s) which is not necessarily property-sensitive. As discussed hereinabove, when these constituents co-polymerize, crosslink and cure and thereby affix to the substrate, a polymeric film is formed as an image on the substrate.

According to some embodiments of the present invention, the property-sensitive agent congeals when, for example, a transition metal oxide is added or the pH or the ionic strength of the media it is dissolved in crosses a certain level. Hence, according to some embodiments of the present invention, the property-sensitive attribute are combined in a dispersant of the colorant. However, according to other embodiments of the present invention the property-sensitive agent is not required to disperse the colorant(s) or be associated therewith in any form.

Exemplary property-sensitive co-polymerizable agents include, without limitation, non-ionic water-emulsifiable resins such as acrylic polymers and copolymers, alkyl-acrylic polymers and copolymers, acrylic-styrene copolymers, polyurethanes, polyethers, polyesters, polyacrylates and some combinations thereof.

According to some embodiments of the present invention, the property-sensitive co-polymerizable agent is a self-crosslinking alkyl-acrylic copolymer, and according to some embodiments, the self-crosslinking alkyl-acrylic copolymer is an ethyl-acrylic/butyl-acrylic copolymer.

The following describes a few representative and non-limiting exemplary combinations of property-sensitive agent in a wetting compositions and property-adjusting agent in an ink composition.

An acid-base interaction can cause a dispersing pH-sensitive agent that is soluble in a basic or neutral composition to precipitate once it comes in contact with a dye discharge composition and/or an immobilization composition containing an acid. Similarly, an emulsified co-polymerizable pH-sensitive agent in the ink composition may no longer hold an emulsion as a result of a decrease in pH. In any such occurrence, the composition experiences a sharp increase in the viscosity, or congelation.

The presence of a metal oxide, such as titanium dioxide or silicon dioxide, affects a family of non-ionic acrylic polymers so as to become sensitive to a drop in the pH of the medium they are emulsified in. Hence, according to some embodiments of the present invention, the dye discharge composition and/or an immobilization composition may include such class of metal oxides which are referred to hereinbelow as a first and a second metal oxide. Such metal oxides do not cause the breakage of the emulsion in the ink composition by themselves, but rather bestow pH-sensitivity to the emulsified species. It is a matter of mechanistic theory to regard such metal oxides as direct property-adjusting agents, however in the context of embodiments of the present invention this assignment can be made or avoided without being bound to any particular theory.

In the context of a multi-part ink composition, the immobilization composition would be referred to as an immobilization part; the dye discharge composition presented herein would be referred to as a dye discharge part; the translucent colored composition would be referred to as translucent colored part; and the opaque underbase composition would be referred to as an opaque underbase part.

The following table summarizes the various parts in an exemplary embodiment of a multi-part ink formulation.

| Multi-part ink formulation | | | |
|---|---|---|---|
| Part | Alternative term and characteristics | Function | Principal ingredients |
| First part | Dye discharge part/composition; Generally transparent and colorless; Typically applied by a designated printhead on a designated area before or concurrently with the | Provides the reducing agent that discharges the dye in the substrate; vicariously provides a property-adjusting agent that causes the ink part(s) that contain the | A reducing agent; A chelating agent; A property-adjusting agent (e.g. an acid); A first carrier (e.g. water); An optional discharge-impervious colorant or dye; An optional co-polymerizable |

-continued

| Part | Alternative term and characteristics | Function | Principal ingredients |
|---|---|---|---|
| | other parts of the multi-part ink composition | property-sensitive agent to congeal on contact; Optionally provides a discharge-impervious colorant or dye; Flattens protruding fibers, smooth and even the surface before fine droplets are printed thereon | agent; An optional crosslinking agent |
| An optional additional First part | Immobilization part/composition; Generally transparent/colorless; Typically printed before or concurrently with the other parts, and after the dye discharge composition | Provides the property-adjusting agent, Optionally provides some of the co-polymerization agent(s) | A property-adjusting agent (e.g. an acid); A first carrier (e.g. water); An optional co-polymerizable agent; An optional crosslinking agent |
| Second part | Colored part; Translucent color part/composition; Generally transparent and colored by CMYK basic colors; Typically printed after and over the first part | Provides the discharge-impervious colorants for the design/image which are dispersed in a property-sensitive dispersant that congeals upon contact with the property-adjusting agent; Provides some of the co-polymerization agent(s) | A dispersed discharge-impervious translucent colorant; A crosslinking agent; A second carrier (e.g. water); A property-sensitive agent (e.g. an acrylate and/or an emulsion thereof); A co-polymerizable agent (e.g. an acrylic mixture and/or an emulsion thereof); A polymerization catalyst |
| Third part | Underbase part; Opaque white part; Generally opaque and white; Typically printed after and over the first part and before the second part | Provides a solid opaque white background to the translucent colors when printed on a non-white substrate; Provides some of the co-polymerization agent(s) | A dispersed opaque colorant (e.g. a metal oxide); A third carrier (e.g. water); A property-sensitive agent (e.g. an acrylate and/or an emulsion thereof); A co-polymerizable agent (e.g. an acrylic mixture and/or an emulsion thereof); A polymerization catalyst; A crosslinking agent; |
| Fourth part | Spot color part; Opaque colored part; Typically printed after and over the second part | Provides a non-"process" solid opaque colored highlights of color over the design/image; Provides some of the co-polymerization agent(s) | A dispersed discharge-impervious opaque colorant (e.g. a metal oxide); A dispersed discharge-impervious translucent colorant; A fourth carrier (e.g. water); A property-sensitive agent (e.g. an acrylate and/or an emulsion thereof); A co-polymerizable agent (e.g. an acrylic mixture and/or an emulsion thereof); A polymerization catalyst; A crosslinking agent; |

One factor that accomplishes satisfactory immobilization of the liquid ink droplets on the substrate is the speed at which the congelation is accomplish. It is accomplished best when a single droplet of any of the translucent colored composition and/or the opaque underbase composition comes in contact with at least a fraction of a droplet of any one of the dye discharge compositions presented herein prior to accumulation of additional droplets on top. The time (speed) factor may determine if a large drop is formed or not, taking into account that larger drops may soak faster into the substrate in cases of absorptive substrates, or coalesce (joining with other droplets) as a result of partial dewetting, leading to the formation of non-uniform and poor coverage of a non-absorptive substrate.

The process presented herein, according to some embodiments thereof, is effected by applying all the various compositions presented herein by means of separate inkjet printheads concurrently, sequentially and substantially concomitantly, or sequentially and very near concomitant application thereof, namely at a time gap or interval that is shorter than about 1-10 seconds between the time a droplet of any one of the dye discharge compositions presented herein contacts the substrate, and the time a droplet of any of the opaque underbase or the translucent colored compositions contacts the same region of the substrate.

According to some embodiments of the invention presented herein, when using an opaque underbase composition, the sequence of printing the various compositions is effected by the following order: dye discharge composition, followed by an opaque underbase, followed by translucent colored compositions. According to some embodiments of the invention presented herein, when not using an opaque underbase composition (for example, when printing on a lightly-colored substrate), the translucent colored compositions may be applied after or together with the dye discharge composition, since the dye discharge process takes effects on the substrate also in the presence of the translucent colored compositions, while the pigments of the translucent colored compositions are impervious to the reducing agent.

Hence, according to some embodiments of the present invention, a time interval between an application of the dye discharge composition and an application of the translucent colored composition, and/or a time interval between an application of the dye discharge composition and an application of the opaque underbase composition if present, are each less than 1 second. According to some embodiments of the present invention, this time interval can be shorter than 0.75 second, shorter than 0.50 seconds and even shorter than 0.25 seconds. According to some embodiments of the present invention, the application of any one of the dye discharge composition presented herein and an application of the translucent colored composition, and/or an application of any of the dye discharge compositions and an application of the opaque underbase composition if present, is effected substantially concurrently.

In some embodiments where more than one translucent colored ink composition or an opaque white ink composition follow the dye discharge composition sequentially, and/or in some embodiments where the printed area is large, there may be occurrences wherein one or more of the translucent colored ink compositions are applied over the printed area of the substrate up to 10 seconds, up to 20 seconds, up to 30 seconds, up to 60 seconds, or up to 120 seconds after the dye discharge composition has been applied thereon.

In embodiments wherein an opaque underbase composition is not required to receive an acceptable white background for the color image, the discharge composition may be applied concomitantly with the translucent colored composition. In case of a typical CMYK process print, each print pass may employ several different printheads (e.g., five printheads), while the discharge composition is applied over the entire image area except the black parts of the image, and the translucent colored compositions are applied according to the digital allocation for each color so as to afford the required final color at each location.

It is noted herein that regardless of the time interval between applications of any composition, all compositions are applied over the substrate while it is still wet with the previous composition, including with the dye discharge composition. In other words, the printing process using any of the dye discharge composition, which may or may not form a part of a multi-part ink formulation, is effected as a "wet-on-wet" process without drying or curing or exposing the designated area on the substrate to an energy source from commencement of the process and until the image is fully formed on the designated area on the substrate.

The process of forming the image on a dyed substrate, according to some embodiments of the present invention, is followed by curing/drying at least the portion of the surface which bears any one of the compositions presented herein. This curing process, which may be effected by blowing hot air over the substrate (e.g., using a conveyor dryer), or by irradiation of the substrate using an infrared source (heat filaments) or by contacting the substrate with a hot object (e.g., heat press or ironing), contributes to the bleaching reaction and to the formation of the film and its adhesion to the substrate. According to some embodiments of the present invention, the curing is effected by heating at least the portion of the surface having the image printed thereon to a temperature that ranges from 130° C. to 180° C., or 140° C. to 160° C. According to some embodiments, curing is effected by heat press or ironing, by means of, e.g., heat press, at least the portion of the surface which bears any one of the compositions presented herein, for 1-60 seconds at a press temperature of 130° C. to 180° C., or 135° C. to 165° C. According to some embodiments, the curing by heat press step is followed by curing by means of a conveyer oven which operated at 140-160° C. for 1-3, 3-5 or 5-10 minutes, depending on the type of substrate, printed area, total amount of printed ink and ambient conditions.

The process as described herein, and any one of the embodiments thereof can be used in combination with any one of the embodiments described herein for a dye discharge composition, colored composition, opaque composition and any other component or composition described herein, in any combination thereof.

It is expected that during the life of a patent maturing from this application many relevant methods, uses and compositions will be developed and the scope of the terms methods, uses, compositions and polymers are intended to include all such new technologies a priori.

As used herein throughout the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein throughout, the phrase "substantially devoid of" a certain substance refers to a composition that is totally devoid of this substance or includes no more than 0.1 weight percent of the substance.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein throughout, the term "alkyl" describes an aliphatic hydrocarbon including straight chain and branched chain groups having 1 to 20 carbon atoms, or 1-10 carbon atoms or 1-8 carbon atoms. Whenever a numerical range; e.g., "1-10", is stated herein, it implies that the group, in this case the alkyl group, may contain 1 carbon atom, 2 carbon atoms, 3 carbon atoms, etc., up to and including 10 carbon atoms. The alkyl can be substituted or unsubstituted. When substituted, the substituent can be, for example, a substantially linear alkyl, a substantially cyclic alkyl (cycloalkyl), an alkenyl, an alkynyl, an aryl, a heteroaryl, a hydroxy, an alkyl interrupted by an O atom (alkoxy) and an alkyl terminated by an O atom (a hydroxyalkyl). The term "alkyl", as used herein, may also encompasses in some embodiments, saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl hereinabove.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl group may be substituted or unsubstituted as described for alkyl hereinabove.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Dye Discharge Composition

Relative amounts of the ingredients are given as percent by weight unless stated otherwise.

A dye discharge composition, according to some of embodiments of the present invention, is generally formulated using the following ingredients, with amounts given in percent by weight of the total weight of the composition:

| | |
|---|---|
| Reducing agent | 5-10% |
| Chelating agent | 5-12% |
| Surface active agent | 0.1-2% |
| Viscosity modifying agent/Humectant | 5-40% |
| Deionized water | QS to 100% |
| pH Buffering | 4.5-6.5 |

The following exemplary dye discharge composition, according to some embodiments of the present invention, was prepared:

| | |
|---|---|
| Decrolin (ZFS) | 500 mM |
| Sodium EDTA | 450 mM |
| Polyether modified polydimethyl siloxane (surface active agent) | 0.2% w/v |
| Glycols | 18% w/v |
| Glycerin | 20% w/v |
| (viscosity modifying agents/Humectants) | |
| Deionized water | QS to 100% |
| pH Buffering (EDTA) | 6.3-6.5 |

Colored Composition:

A typical translucent colored composition, according to some embodiments of the present invention, generally formulated using the following ingredients, with amounts given in percent by weight of the total weight of the composition:

| | |
|---|---|
| Pigment | 1.5-5% |
| Dispersant | 1-9% |
| Surfactants | 0.1-2.0% |
| Film-forming agent | 10-25% |
| Viscosity modifying agent/Humectant | 10-40% |
| Buffer (basic/amine) | 0.1-0.4% |
| Deionized water | QS to 100% |
| pH Buffering | higher than 7 |

The following exemplary translucent colored composition, according to some embodiments of the present invention, was prepared:

| | |
|---|---|
| Pigment (C, M, Y or K) | 2-4% |
| Carboxylated polymer (Dispersant) | 5% |
| Surfactant Polyether dimethyl siloxane | 2% |
| Glycols/glycerin | 40% |
| Emulsified acrylic polymer (40-50% solid) | 30% |
| Carbodiimide crosslinker | 3% |
| Amine (buffering) | 0.1-0.4% |
| Deionized water | QS to 100% |
| pH Buffering | 7.5 |

Opaque Underbase Composition:

A typical opaque underbase composition, according to some embodiments of the present invention, is generally formulated using the following ingredients, with amounts given in percent by weight of the total weight of the composition:

| | |
|---|---|
| Opaque white pigment | 8-12% |
| Dispersant | 4% |
| Surfactant | 0.3-0.6% |
| Defoamer | 0.3-0.6% |
| Film-forming agent emulsion | 40-50% (40-50% solids) |
| Crosslinkers | 1-3% |
| Humectant | 35-50% |
| Buffer (basic/amine) | 0.1-0.4% |
| Deionized water | QS to 100% |
| pH Buffering | higher than 7 |

The following exemplary opaque underbase composition, according to some embodiments of the present invention, was prepared:

| | |
|---|---|
| Titania | 10% |
| High MW polyacrylate dispersant | 3.8% |
| Polyether dimethyl siloxane | 0.4% |
| Acrylate sodium salt | 1.5% |
| Glycols | 25% |
| Acrylic emulsion | 38% |
| Carbodiimide crosslinker | 3% |
| Tertiary Amine | 0.2% |
| Deionized water | QS to 100% |
| pH Buffering | 7.5 |

Example 2

The following is an exemplary process using a dye discharge composition and a translucent colored composition and/or an opaque underbase composition, designed for coagulation upon contact therebetween, according to some embodiments of the present invention. It should be noted that this exemplary process is applicable for other compositions presented herein, including such wherein no coagulation occurs.

The exemplary printing process, according to embodiments of the present invention, is performed as follows:

A dyed substrate, such as a darkly-dyed (darkly-colored) textile piece, is placed in a printing machine equipped with a plurality of printheads.

A separate printhead is loaded with one of the following:

A dye discharge composition;

A translucent cyan colored composition;

A translucent magenta colored composition;

A translucent yellow colored composition;

A translucent black colored composition; and

An opaque white underbase composition.

Optionally additional colored ink compositions such as green, red, light colors and others can be added in additional separate printheads so as to extend the range of color gamut/spectrum.

The programmable digital information of the image is fed into the computerized controller of the printing machine, and the plurality of printheads is driven over the substrate.

The printheads containing the dye discharge and the opaque compositions apply their contents concurrently stripwise according to the digitized design, thereby forming a silhouette of the design on the substrate strip by strip.

Once the first strip of the silhouette is applied on a portion of the substrate, the printheads containing the CMYK compositions apply a mixture of translucent ink compositions over the same portion of the area where the silhouette has been formed.

The process continues strip-wise until all the image is formed on the substrate.

The substrate is moved into a conveyer oven which operates at 140° C. for 5-10 minutes.

It is noted that this process may be effected without applying an underbase layer of an opaque white colorant, particularly in substrates which exhibit undergoes a dye discharge reaction which affords a bright bleached-out material, or when the specific requirements allow the design to be printed over the bleaches area without further whitening thereof. In such case the discharge ink may be applied concomitantly with the translucent colored composition(s) without applying an opaque underbase composition.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A dye discharge composition comprising a reducing agent, a chelating agent and a first carrier, the composition is forming a part of an ink formulation, said ink formulation further comprises a translucent colored composition, said translucent colored composition comprising a colorant, a dispersing agent and a second carrier, the composition is for forming a dye discharged area on a surface of a dyed substrate, wherein said reducing agent is a sulfur-based reducing agent, the composition is having a pH that ranges from 3 to 6.5.

2. The composition of claim 1, wherein said first carrier is an aqueous carrier.

3. The composition of claim 1, wherein a concentration of said sulfur-based reducing agent ranges from 300 mM to 700 mM.

4. The composition of claim 1, wherein said chelating agent is a polyamino carboxylic acid chelating agent.

5. The composition of claim 4, wherein a concentration of said chelating agent ranges from 300 mM to 700 mM.

6. The composition of claim 1, wherein a molar ratio of said reducing agent to said chelating agent ranges from 0.8 to 1.2.

7. The composition of claim 1, wherein said pH is 6.3.

8. The composition of claim 1, further comprising a colorant which is impervious to said reducing agent.

9. The composition of claim 1, wherein said translucent colored composition congeals or coagulates upon contact with the dye discharge composition.

10. The composition of claim 1, wherein said ink formulation further comprises an opaque underbase composition, said opaque underbase composition comprises an opaque white colorant, a dispersing agent and a third carrier.

11. The composition of claim 10, wherein said opaque white colorant comprises a plurality of metal oxide particles.

12. The composition of claim 10, wherein said opaque underbase composition congeals or coagulates upon contact with the dye discharge composition.

13. The composition of claim 1, wherein said ink formulation further comprises an immobilization composition, and wherein said translucent colored composition congeals or coagulates upon contact with said immobilization composition.

14. A kit comprising a packaging material and the dye discharge composition of claim 1 packaged therein.

15. The kit of claim 14, wherein said reducing agent and said chelating agent are packaged individually within the kit.

16. The kit of claim 15, wherein said first carrier is packaged together with said chelating agent.

17. The kit of claim 15, wherein each of said reducing agent, said chelating agent and said first carrier is packaged individually within the kit.

18. The kit of claim 15, further comprising instructions to mix said reducing agent, said chelating agent and said first carrier, so as to obtain the dye discharge composition.

19. The kit of claim 14, wherein said reducing agent, said chelating agent and said first carrier are packaged together within the kit.

20. The kit of claim 14, further comprising a translucent colored composition packaged individually within the kit.

21. The kit of claim 14, further comprising an opaque underbase composition packaged individually within the kit.

22. The kit of claim 14, further comprising an immobilization composition packaged individually within the kit.

23. A process of discharging a dye from a portion of a dyed substrate, the process comprising digitally applying, by means of inkjet printing, onto said portion of said dyed substrate the dye discharge composition of claim 1.

24. The process of claim 23, further comprising digitally applying substantially over said portion, by means of a plurality of inkjet printheads, a translucent colored composition, thereby forming an image on the dyed substrate.

25. The process of claim 24, wherein said translucent colored composition congeals or coagulates upon contact with said dye discharge composition.

26. The process of claim 24, further comprising, prior to said applying said translucent colored composition, digitally applying an opaque underbase composition substantially over said portion.

27. The process of claim 26, wherein said opaque underbase composition congeals or coagulates upon contact with the dye discharge composition.

* * * * *